US006187929B1

United States Patent
Fukuda et al.

(10) Patent No.: US 6,187,929 B1
(45) Date of Patent: Feb. 13, 2001

(54) DYE USABLE FOR PHOTOGRAPHIC LIGHTSENSITIVE MATERIAL, FINE SOLID PARTICLE DISPERSION OF SAID DYE AND SILVER HALIDE PHOTOGRAPHIC LIGHTSENSITIVE MATERIAL CONTAINING SAID FINE SOLID PARTICLE DISPERSION OF SAID DYE

(75) Inventors: Mitsuhiro Fukuda; Motoaki Sugino; Akira Onishi, all of Hino (JP)

(73) Assignee: Konica Corporation, Tokyo (JP)

( * ) Notice: Under 35 U.S.C. 154(b), the term of this patent shall be extended for 0 days.

(21) Appl. No.: 09/333,078

(22) Filed: Jun. 14, 1999

(30) Foreign Application Priority Data

Jun. 22, 1998 (JP) .................................................. 10-174669

(51) Int. Cl.$^7$ ................................................. C07D 403/06
(52) U.S. Cl. .................. 548/364.7; 544/300; 546/269.7; 546/272.7; 546/276.1; 548/183; 548/243; 548/306.1; 548/312.4; 548/364.1
(58) Field of Search ............................... 548/364.1, 364.7

(56) References Cited

U.S. PATENT DOCUMENTS

| | | |
|---|---|---|
| 4,904,578 | 2/1990 | Tanaka et al. . |
| 5,665,528 | 9/1997 | Wariishi et al. . |

Primary Examiner—Robert W. Ramsuer
(74) Attorney, Agent, or Firm—Frishauf, Holtz, Goodman, Langer & Chick, P.C.

(57) ABSTRACT

A dye represented by the following formula (1);

Formula (1)

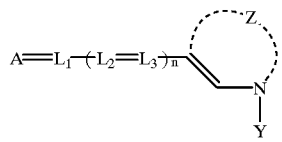

wherein A represents an acidic nucleus, $L_1$, $L_2$ and $L_3$ represent a methine group, n represents 0, 1 or 2, Z represents a nonmetalic atom group necessary to form a heterocyclic group by bonding with a nitrogen atom included in the above formula (1), Y represents a substituent represented by the following formula (2) or a heterocyclic group;

Formula (2)

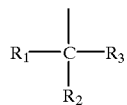

wherein $R_1$ and $R_2$ represent an alkyl group, and $R_1$ and $R_2$ may form a ring by bonding with each other, $R_3$ represents a hydrogen atom or an electron withdrawing group: said dye represented by the above formula (1) has at least one carboxy group or one alkylsulfonamide group in an aromatic ring portion of its molecular structure.

2 Claims, No Drawings

DYE USABLE FOR PHOTOGRAPHIC LIGHTSENSITIVE MATERIAL, FINE SOLID PARTICLE DISPERSION OF SAID DYE AND SILVER HALIDE PHOTOGRAPHIC LIGHTSENSITIVE MATERIAL CONTAINING SAID FINE SOLID PARTICLE DISPERSION OF SAID DYE

FIELD OF THE INVENTION

The present invention relates to a silver halide photographic lightsensitive material (hereinafter referred to as photographic lightsensitive material) comprising a dyed hydrophilic colloidal layer, specifically a silver halide photographic lightsensitive material comprising a novel nondiffusible dye which does not give sensitivity loss but gives improved decoloring ability in development process, reduced fog, and improved stability with passage of time.

BACKGROUND OF THE INVENTION

In recent years, requirement for improving performance of the photographic lightsensitive material has been more and more severe and higher image quality such as excellent sharpness and excellent color reproduction has been required.

Furthermore, to cope with instantaneousness of an electrophotographic material, more shortened processing time, namely, super high speed processing ability has recently been required. In order to realize the high image quality and the super high speed processing ability required for the photographic lightsensitive material, a great effort to thin layers of the photographic lightsensitive material and optimize a silver halide and additives has been made.

In general, it is well known that a dye is contained in the silver halide photographic lightsensitive material to improve image quality and sensitivity adjustment of a lightsensitive emulsion, for example, the dye is used for prevention of halation, prevention of irradiation and light absorbing filter. Furthermore, usage of the dye has recently been widened as mentioned below. That is, the dye is used for the purpose of substitution of a yellow colloidal silver in a color photographic lightsensitive material (hereinafter referred to as YC dye); the dye is used in a cross-over cut layer of a X-ray photographic lightsensitive material; and the dye is used in a nonsensitive emulsion layer of a printing photographic lightsensitive material.

The dye used for these purposes must have an excellent absorption characteristic in accordance with the purpose to use it. In the case of YC dye, it is preferable that the YC dye has an absorption in the wavelength of inherent sensitivity of silver halide, moreover, its absorption at longer wavelength is sharply cut so as not to bring sensitivity lowering of a green sensitized lightsensitive emulsion layer. Furthermore, the dye must satisfy the following items, namely, (i) the dye is completely decolored during developing process, (ii) it is easily leached out from the lightsensitive material during the developing process, (iii) stain caused by the residual dye after process does not occur, (iv) it does not bring an unpreferable affection such as fog, etc. to a lightsensitive emulsion, (v) it does not diffuse from a dyed layer to other layers, (vi) its stability with passage of time in the lightsensitive material or an emulsion coating solution is excellent so as not to cause discoloration.

In order to satisfy the above-mentioned items, various dyes have been proposed, for example, azo dye, oxonole dye described in British Patent No. 506,385, Japanese Patent Examined Publication No. 39-22069, merocyanine dye described in U.S. Pat. No. 2,493,747, styryl dye described in U.S. Pat. No. 1,845,404 are proposed.

These dyes are generally dissolved in water or water miscible organic solvent and then added to a photographic construction layer. However, in cases where the dye is water soluble, it diffuses through all layers from a layer where the dye is desired to stay. In order to attain intended purpose, more amount of the dye including amount of the dye diffusing to other layers is necessary to be added so that unpreferable phenomena such as sensitivity lowering, gradation deviation, fog formation, etc. are found in both the layer to which the dye is added and other layers. Specifically, in cases where the photographic material is stored with passage of time, occurrence of fog or sensitivity lowering is remarkable and to reduce using amount of the dye to prevent these problems leads not to obtain sufficient light absorbing effect. To meet these problems, a dye having reduced diffusibility so as to dye a specified layer is known, for example, as nondiffusible dyes, oil soluble dyes are described in U.S. Pat. Nos. 2,538,008, 2,538,009, 4,420,555, 4,940,654, Japanese Patent Publication Open to Public Inspection (hereinafter referred to as JP-A) Nos. 61-204630, 61-205934, 62-32460, 62-56958, 62-92949, 62-222248, 63-40143, 63-184749, 63-316852, 1-179042, 3-75632, 3-109535, 3-144438, 3-179441, 4-362634, 5-53241, 5-86056, 5-209133, 5-289239 and 5-296848.

A method to immobilize the dye using fine solid particle of a water insoluble dye are described in World Patent WO No. 88/4,794, U.S. Pat. No. 4,923,788, JP-A Nos. 63-197943, 64-40827, 1-155341, 1-172828, 2-1839, 2-110453, 3-23341, 3-206443, 3-216644, 3-216645, 3-216646, 3-217838, 3-231241, 4-37740, 4-37841, 4-44033, 4-116548, 4-296848, 5-197079, 6-110155. Further, the photographic lightsensitive material containing fine solid particle dispersion of the dye which is derived from a nitrogen containing heterocyclic ring bonded with an acidic nucleus through a methine chain is described in U.S. Pat. Nos. 5,213,957, 5,665,528, and JP-A No. 8-50345.

However, decoloring ability of these dyes are insufficient in processing processes so that these dyes has defect to cause color stain after processing. In cases where rapid process, improvement of processing solution composition and improvement of photographic emulsion composition are employed, these dyes are insufficient in terms of leachability and nondiffusibility so that these dyes diffuse to other layers when stored to lead to sensitivity loss and fog formation.

SUMMARY OF THE INVENTION

Accordingly, an object of the present invention is to provide a nondiffusible dye which can satisfy the above-mentioned requirement. Another object of the present invention is to provide a high speed silver halide photographic lightsensitive material with reduced fog formation and improved stability with passage of time.

DETAILED DESCRIPTION OF THE INVENTION

The above objects are attained by the following constitution.

1. A dye represented by the following formula (1);

Formula (1)

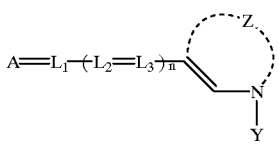

wherein A represents an acidic nucleus, $L_1$, $L_2$ and $L_3$ represent a methine group, n represents 0, 1 or 2, Z represents a nonmetalic atom group necessary to form a heterocyclic group by bonding with a nitrogen atom included in the formula (1), Y represents a substituent represented by the following formula (2) or a heterocyclic group;

Formula (2)

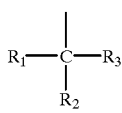

wherein $R_1$ and $R_2$ represent an alkyl group, and $R_1$ and $R_2$ may form a ring by bonding with each other, $R_3$ represents a hydrogen atom or an electron withdrawing group: said dye represented by the formula (1) has at least one carboxy group or one alkylsulfonamide group in an aromatic ring portion of its molecular structure.

2. A fine solid particle dispersion of a dye represented by the following formula (1), Formula (1)

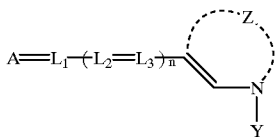

wherein A represents an acidic nucleus, $L_1$, $L_2$ and $L_3$ represent a methine group, n represents 0, 1 or 2, Z represents a nonmetalic atom group necessary to form a heterocyclic group by bonding with a nitrogen atom included in the formula (1), Y represents a substituent represented by the following formula (2) or a heterocyclic group;

Formula (2)

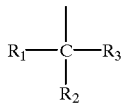

wherein $R_1$ and $R_2$ represent an alkyl group, and $R_1$ and $R_2$ may form a ring by bonding with each other, $R_3$ represents a hydrogen atom or an electron withdrawing group: said dye represented by the formula (1) has at least one carboxy group or one alkylsulfonamide group in an aromatic ring portion of its molecular structure.

3. A silver halide photographic lightsensitive material comprising a support having thereon one or more layers in which at least one of said layers contains a dye represented by the following Formula (1) in the form of fine solid particle dispersion, Formula (1)

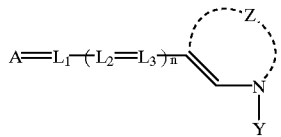

wherein A represents an acidic nucleus, $L_1$, $L_2$ and $L_3$ represent a methine group, n represents 0, 1 or 2, Z represents a nonmetalic atom group necessary to form a heterocyclic group by bonding with a nitrogen atom included in the formula (1), Y represents a substituent represented by the following formula (2) or a heterocyclic group;

Formula (2)

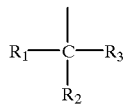

wherein $R_1$ and $R_2$ represent an alkyl group, and $R_1$ and $R_2$ may form a ring by bonding with each other, $R_3$ represents a hydrogen atom or an electron withdrawing group: said dye represented by the formula (1) has at least one carboxy group or one alkylsulfonamide group in an aromatic ring portion of its molecular structure.

4. The silver halide photographic lightsensitive material of item 3, wherein A of the formula (1) is an acidic nucleus selected from the group consisting of 2-pyrazoline-5-one, barbituric acid, thiobarbituric acid, isoxazolone and pyrazolidine-3,5-dione.

5. The silver halide photographic lightsensitive material of item 3, wherein A of the formula (1) is 2-pyrazoline-5-one.

6. The silver halide photographic lightsensitive material of item 3, wherein said dye represented by the formula (1) is a dye represented by the following formula (3), Formula (3)

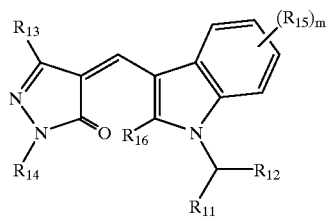

wherein $R_{11}$ and $R_{12}$ represent an alkyl group, and $R_{11}$ and $R_{12}$ may form a ring by bonding with each other, $R_{13}$, $R_{14}$ and $R_{15}$ represent a substituent, $R_{16}$ is a hydrogen atom or a substituent, m is an integer of 0 to 4: said dye represented by the formula (3) has at least one carboxy group or one alkylsulfonamide group in an aromatic ring portion of its molecular structure.

7. The silver halide photographic lightsensitive material of item 3, wherein $R_3$ of the formula (2) is an electron withdrawing group having Hammett's σp value of not less than 0.3.

8. The silver halide photographic lightsensitive material of item 3, wherein an average particle size of the dye represented by the formula (1) is 0.01 to 0.3 μm.

The present invention will be explained in detail below.

A compound represented by Formula (1) will be explained.

In the above formula (1), acidic nucleus group represented by A includes 2-pyrazoline-5-one, pyrazolidinedione, barbituric acid, thiobarbituric acid, rhodanine, hydantoin, thiohydantoin, oxazolone, isoxazolone, indanedione, hydroxypyridone and pyrazolopyridone, etc., and preferable ones are 2-pyrazoline-5-one, barbituric acid, thiobarbituric acid, isoxazolone and pyrazolidine-3,5-dione, most preferable one is 2-pyrazoline-5-one. These acidic nuclei may have substituents and examples of said substituents include an alkyl group (for example, methyl group, ethyl group, hexyl group, etc.), a cycloalkyl group (for example, cyclohexyl group, cyclopentyl group, etc.), an aryl group (for example, phenyl group, tolyl group, 4-hydroxyphenyl group, 4-carboxyphenyl group, etc.), an aralkyl group (for example, benzyl group, phenethyl group, etc.), an alkoxy group (for example, methoxy group, ethoxy group, tert-butoxy group, etc.), an aryloxy group (for example, phenoxy group, 4-methylphenoxy group, etc.), a heterocyclic group (for example, pyridyl group, furyl group, thienyl group, etc.), a substituted or an unsubstituted amino group (for example, dimethylamino group, diethylamino group, anilino group, etc.), an alkylthio group (for example, methylthio group, etc.), an acyl group (for example, acetyl group, pivaloyl group, benzoyl group, etc.), an alkoxycarbonyl group (for example, methoxycarbonyl group, ethoxycarbonyl group, 2-hydroxyethoxycarbonyl group, etc.), a carbamoyl group (for example, carbamoyl group, methycarbamoyl group, ethylcarbamoyl group, 2-hydroxyethylcarbamoyl group, dimethylcarbamoyl group, 4-carboxyphenylcarbamoyl group, etc.) and a cyano group. It is very important for the compound represented by formula (1) to function as a dye that what position of the acidic nucleus forms bonding with $L_1$ of the formula (1), but the above item is well known in this art and confirmed experimentally.

Methine groups represented by $L_1$, $L_2$ and $L_3$ of the formula (1) include those having substituents and examples of substituents are those as described above as the substituents for the acidic nucleus group A of the formula (1).

In the formula (1), examples of heterocyclic compounds formed by Z together with a nitrogen atom include pyrrole, pyrazole, imidazole, triazole and tetrazole. Furthermore, said heterocyclic compounds may be condenced with a benzene ring to produce, for example, indole, indazole and benzimidazole. Said heterocyclic compounds include those having substituents and examples of substituents are those as described above as the substituents for the acidic nucleus group A and additionally a halogen atom.

In the formula (1), Y represents a substituent represented by the formula (2) or a heterocyclic group. Examples of said heterocyclic groups include pyrrole, imidazole, pyrazole, pyridine, pyrimidine, thiophene, quinoline, benzimidazole, indole, benzthiazole, sulfolane, thiacyclohexane-1,1-dioxide, butyrolactone, pyran, morpholine, piperidine, etc. Said heterocyclic groups include those having substituents and examples of substituents are those as described above as the substituents for the acidic nucleus group A of the formula (1) and additionally a halogen atom.

In Formula (2), $R_1$ and $R_2$ independently represent an alkyl group, for example, are cited methyl group, ethyl group, isopropyl group, butyl group, neopentyl group and octyl group, and preferable groups are methyl group and ethyl group. $R_1$ and $R_2$ may form a ring with each other, for example, are cited cyclohexane, cyclopentane, cyclohexene, cyclohexanone, norbornane, norbornene and adamantane, etc. Said alkyl groups and the rings formed by bonding $R_1$ with $R_2$ include those having substituents and examples of substituents are those as described above as the substituents for the acidic nucleus group A of the formula (1) and additionally a halogen atom.

In the formula (2), $R_3$ represents a hydrogen atom or an electron withdrawing group. Examples of the electron withdrawing group include ethynyl group, 2-phenylethynyl group, benzoyloxy group, chloromethyl group, trichloromethyl group, pentachlorophenyl group, phenylthio group, 2-thienyl group, cyano group, alkoxycarbonyl group (for example, methoxycarbonyl group, ethoxycarbonyl group, butoxycarbonyl group, octyloxy carbonyl group, etc.), aryloxycarbonyl group (for example, phenoxycarbonyl group, 4-hydroxyphenoxycarbonyl group, etc.), carbamoyl group (for example, carbamoyl group, methylcarbamoyl group, ethylcarbamoyl group, butylcarbamoyl group, dimethylcarbamoyl group, phenylcarbamoyl group, 4-carboxyphenylcarbamoyl group, etc.), acyl group (for example, methylcarbonyl group, ethylcarbonyl group, butylcarbonyl group, phenylcarbonyl group, 4-ethylsulfonamidephenylcarbonyl group, etc.), alkylsulfonyl group (for example, methylsulfonyl group, ethylsulfonyl group, butylsulfonyl group, octylsulfonyl group, etc.), arylsulfonyl group (for example, phenylsulfonyl group, 4-chlorophenylsulfonyl group, etc.). The preferable electron withdrawing groups are those having substitutional group constant, Hammett's σp value (Toshio Fujita, "Kagakunoryoiki (Territory of Chemistry), an extra number 122, Structure-Activity Relationship", page 96 to 103 (1979) published by Nankodo) of not less than 0.3, for examle, are cited cyano group, alkoxycarbonyl group, aryloxycarbonyl group, carbamoyl group, acyl group, alkylsulfonyl group, arylsulfonyl group. Specifically preferable ones are alkoxycarbonyl group, alkylsulfonylamino group, trifluoromethyl group and cyano group.

As mentioned above, a compound represented by the formula (1) contains at least one carboxyl group or alkylsulfonylamino group in an aromatic portion of its molecular structure. As examples of alkylsulfonylamino groups, are cited methylsulfonylamino group and ethylsulfonylamino group, etc. Preferable ones are carboxyl group and methylsulfonylamino group, specifically preferable one is carboxyl group.

Further, in the formula (3), $R_{11}$ and $R_{12}$ independently represent alkyl group. As examples of alkyl groups, are cited methyl group, ethyl group, isopropyl group, butyl group, neopentyl group and octyl group, preferably methyl group and ethyl group. $R_{11}$ and $R_{12}$ may bond with each other to form a ring. Examples of such rings include cyclohexane, cyclopentane, cyclohexene, cyclohexanone, norbornane, norbornene and adamantane. Said alkyl groups and the rings formed by bonding $R_{11}$ with $R_{12}$ include those having substituents and examples of substituents are those as described above as the substituents for the acidic nucleus group A of the formula (1) and additionally a halogen atom.

In the formula (3), $R_{13}$, $R_{14}$ and $R_{15}$ represent substituent. Examples of the substituents are those as described above as the substituents for the acidic nucleus group A of the formula (1) and additionally a halogen atom, and m is an integer of 0 to 4, when m is not less than 2, $R_{15}$ may be the same or different. $R_{16}$ represents a hydrogen atom or a substituent and examples of said substituents are those as described above as the substituents for the acidic nucleus group A of the formula (1) and additionally a halogen atom. Preferable one is a hydrogen atom or alkyl group, specifically preferable one is a hydrogen atom or methyl group. Since the dye according to the present invention has an aromatic portion in its molecular structure, in the formula (3), at least one of $R_{11}$, $R_{12}$, $R_{13}$, R14, $R_{15}$ and $R_{16}$ is necessarily carboxyl group or alkylsulfonamide group, or a substituent having carboxyl group or alkylsulfonamide group. When $R_{15}$ is carboxyl group or alkylsulfonamide group, or a substituent having carboxyl group or alkylsulfonamide group, m is an integer of 1 to 4.

Embodiments of the compounds used in the present invention will be shown below, but this invention is not limited thereto.

| | $R_{11}$ | $R_{12}$ | $R_{13}$ |
|---|---|---|---|
| I-1 | —$NH_2$ | —C$_6$H$_4$-$CO_2H$ (para) | —$CH(CH_3)_2$ |
| I-2 | —$NH_2$ | —C$_6$H$_4$-$CO_2H$ (para) | —$CH(CH_3)C_2H_5$ |
| I-3 | —$NH_2$ | —C$_6$H$_4$-$CO_2H$ (para) | —$CH(CH_3)CH_2CO_2CH_3$ |
| I-4 | —$NH_2$ | —C$_6$H$_4$-$CO_2H$ (para) | —$CH(CH_3)CH_2OCH_3$ |
| I-5 | —$NH_2$ | —C$_6$H$_4$-$CO_2H$ (para) | —$CH(CH_3)CH_2CN$ |
| I-6 | —$NH_2$ | —C$_6$H$_4$-$NHSO_2CH_3$ (para) | —$CH(CH_3)_2$ |
| I-7 | —$NH_2$ | —C$_6$H$_4$-$NHSO_2CH_3$ (para) | —$CH(CH_3)C_2H_5$ |
| I-8 | —$NH_2$ | —C$_6$H$_4$-$NHSO_2CH_3$ (para) | —$CH(CH_3)CH_2CO_2CH_3$ |
| I-9 | —$NH_2$ | —C$_6$H$_4$-$NHSO_2C_4H_9$ (para) | —$CH(CH_3)_2$ |

-continued
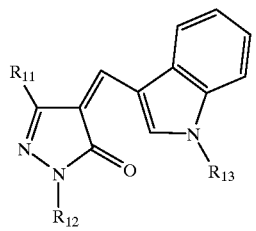
| | R₁₁ | R₁₂ | R₁₃ |
|---|---|---|---|
| I-10 | —NH₂ | 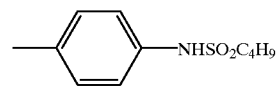 —NHSO₂C₄H₉ | —CH(CH₃)C₂H₅ |
| I-11 | —CH₃ | 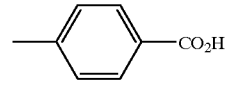 —CO₂H | —CH(CH₃)₂ |
| I-12 | —CH₃ | 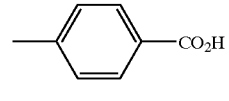 —CO₂H | —CH(CH₃)C₂H₅ |
| I-13 | —CH₃ | 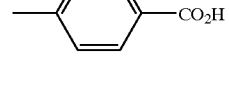 —CO₂H | —CH(CH₃)CH₂CO₂CH₃ |
| I-14 | —CH₃ | 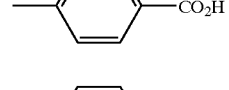 —CO₂H | —CH(CH₃)CH₂OCH₃ |
| I-15 | —CH₃ | 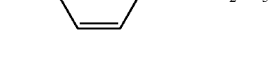 —NHSO₂CH₃ | —CH(CH₃)CH₂CN |
| I-16 | —CH₃ | 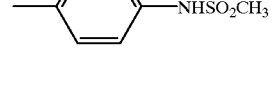 —NHSO₂CH₃ | —CH(CH₃)₂ |
| I-17 | —CH₃ | 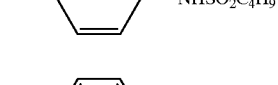 —NHSO₂C₄H₉ | —CH(CH₃)C₂H₅ |
| I-18 | —OCH₂CH₃ | 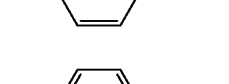 —CO₂H | —CH(CH₃)CH₂CO₂CH₃ |
| I-19 | —OCH₂CH₃ | 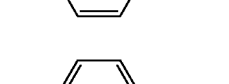 —CO₂H | —CH(CH₃)₂ |
| I-20 | —OCH₂CH₃ | 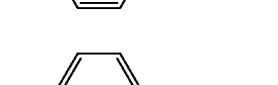 —NHSO₂CH₃ | —CH(CH₃)C₂H₅ |
| I-21 | —CH₃ |  —CO₂H | —CH(CH₃)₂ |

-continued
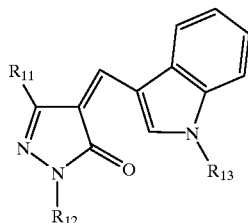
| | $R_{11}$ | $R_{12}$ | $R_{13}$ |
|---|---|---|---|
| I-22 | —$CH_3$ | —C₆H₄-$CO_2H$ | —$CH(CH_3)C_2H_5$ |
| I-23 | —$CH_3$ | —C₆H₄-$CO_2H$ | —$CH(CH_3)CH_2CO_2CH_3$ |
| I-24 | —$CH_3$ | —C₆H₄-$NHSO_2CH_3$ | —$CH(CH_3)_2$ |
| I-25 | —$NH_2$ | —C₆H₄-$CO_2H$ | —$CH(CH_3)C_2H_5$ |
| I-26 | —$NH_2$ | —C₆H₄-$CO_2H$ | —$CH(CH_3)CH_2CO_2CH_3$ |
| I-27 | —$NH_2$ | —C₆H₄-$CO_2H$ | —$CH(CH_3)C_2H_5$ |
| I-28 | —$NH_2$ | —C₆H₄-$NHSO_2CH_3$ | —$CH(CH_3)_2$ |
| I-29 | —$OCH_2CH_3$ | —C₆H₄-$CO_2H$ | —$CH(CH_3)_2$ |
| I-30 | —$OCH_2CH_3$ | —C₆H₄-$NHSO_2CH_3$ | —$CH(CH_3)C_2H_5$ |
I-31

-continued
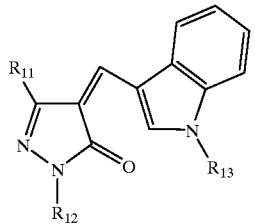
| $R_{11}$ | $R_{12}$ | $R_{13}$ |
|---|---|---|
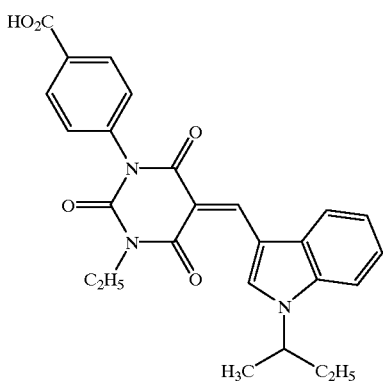
I-32
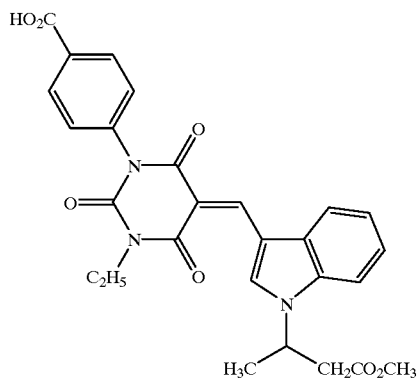
I-33
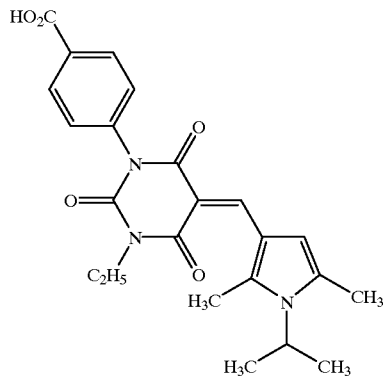
I-34

-continued
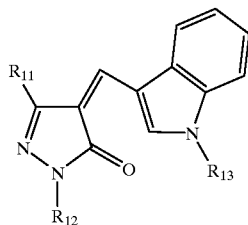
| $R_{11}$ | $R_{12}$ | $R_{13}$ |
|---|---|---|
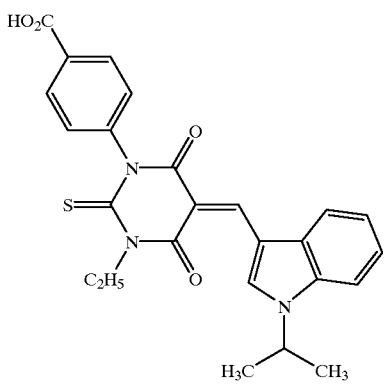
I-35
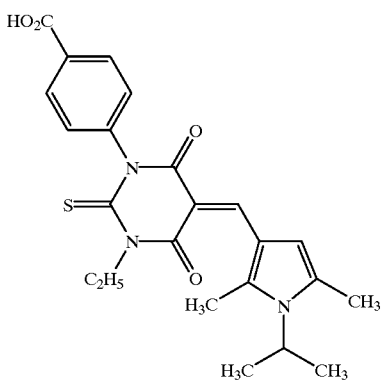
I-36
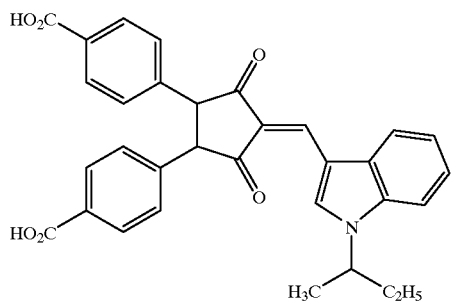
I-37

-continued
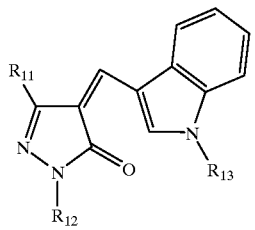
| $R_{11}$ | $R_{12}$ | $R_{13}$ |
|---|---|---|
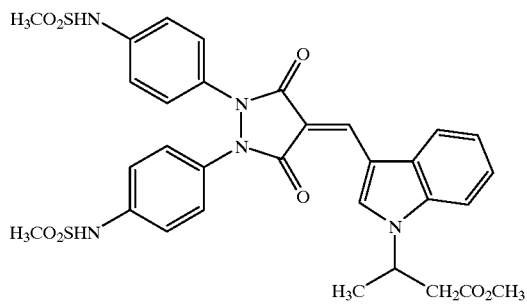
I-38
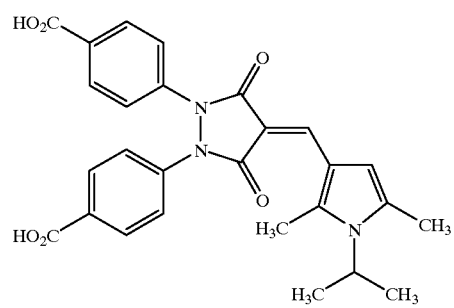
I-39
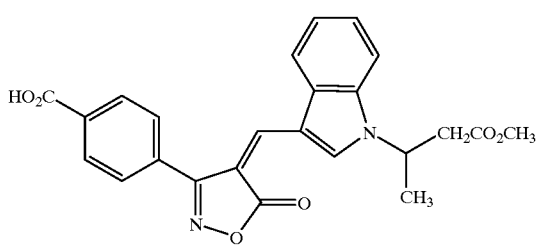
I-40
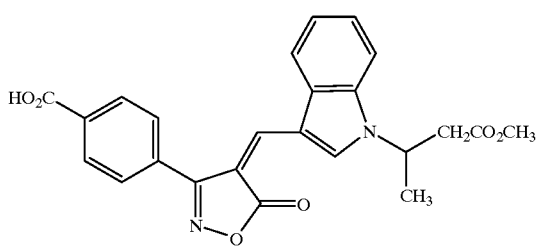
I-41

-continued
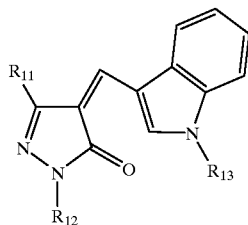
| $R_{11}$ | $R_{12}$ | $R_{13}$ |
| --- | --- | --- |
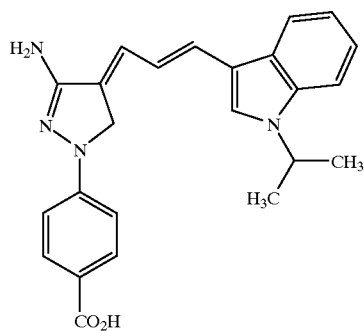
I-42
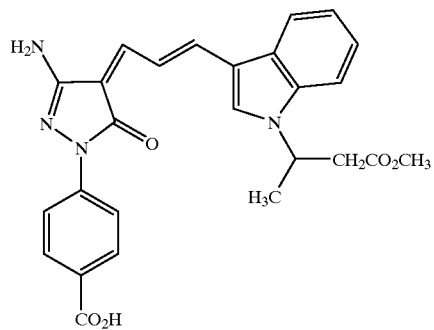
I-43
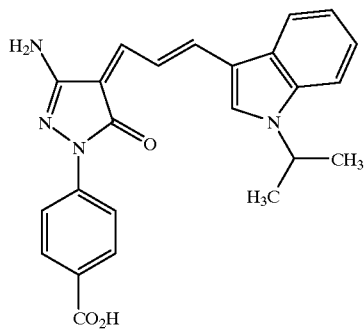
I-44

-continued
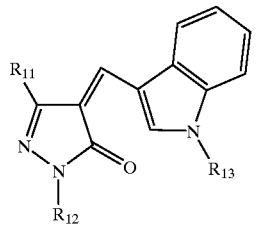
| $R_{11}$ | $R_{12}$ | $R_{13}$ |
|---|---|---|
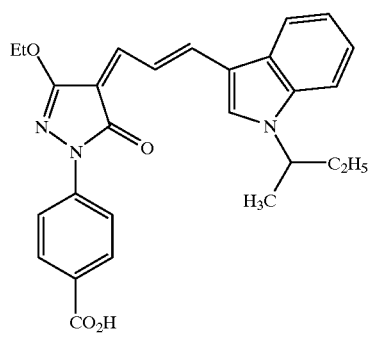
I-45
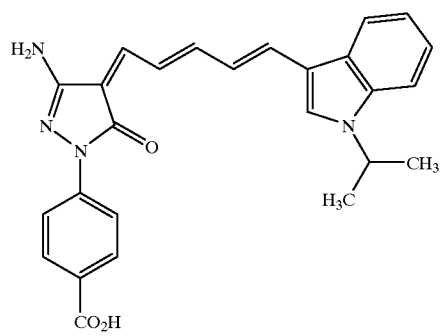
I-46
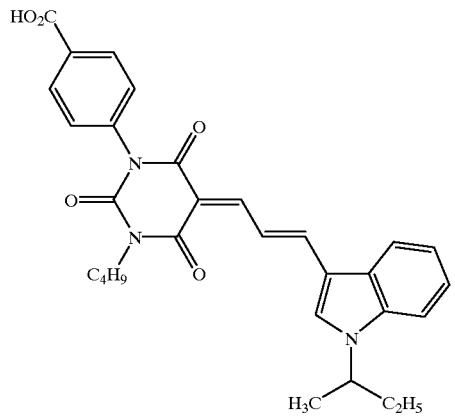
I-47

-continued
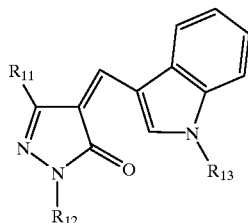
| $R_{11}$ | $R_{12}$ | $R_{13}$ |
|---|---|---|
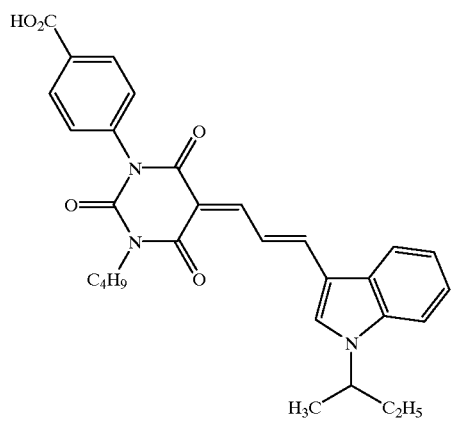
I-48
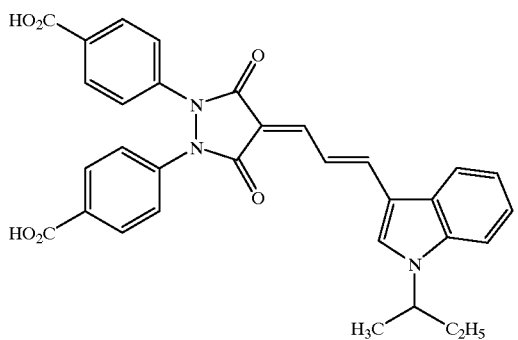
I-49
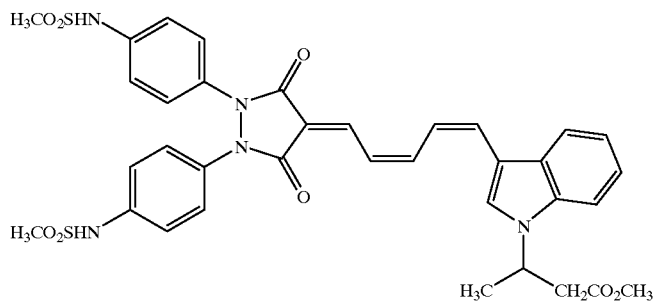
I-50

-continued
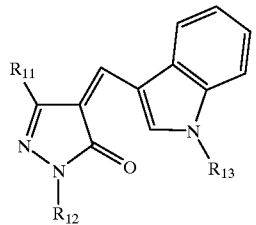
| $R_{11}$ | $R_{12}$ | $R_{13}$ |
|---|---|---|
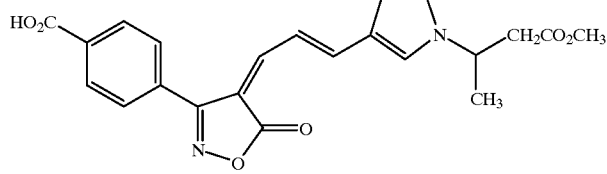
II-1
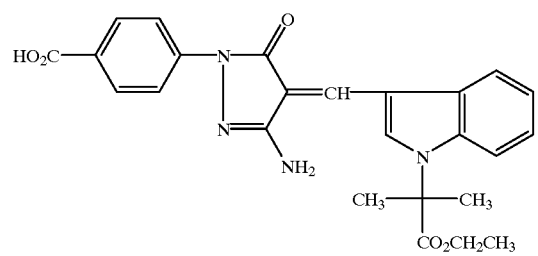
II-2
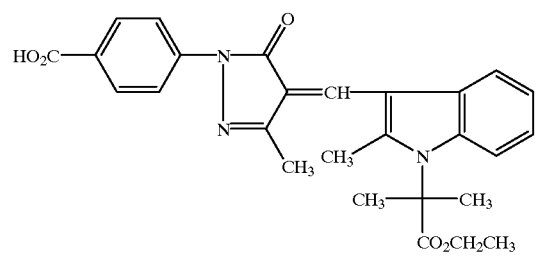
II-3
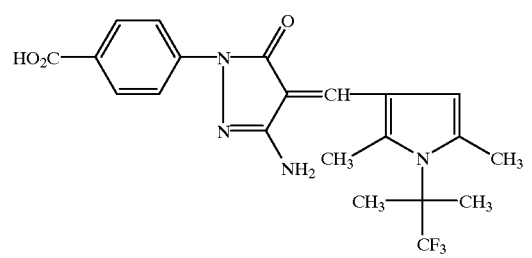
II-4
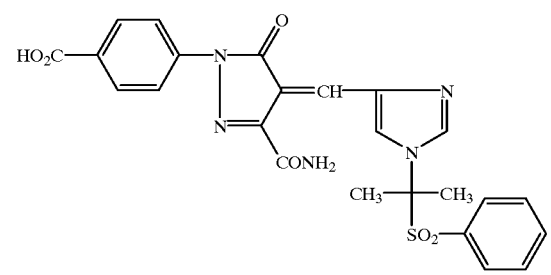
II-5
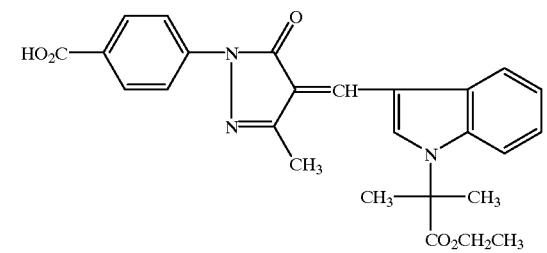
II-6
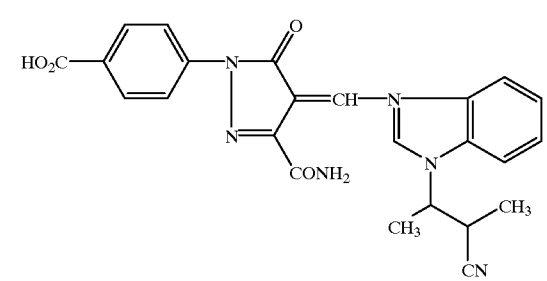

II-7
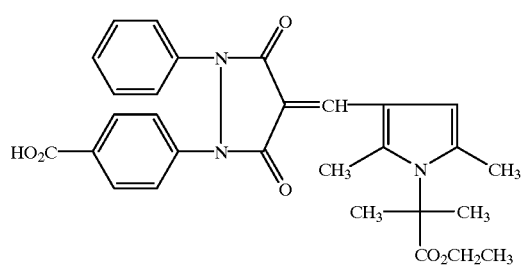
II-8
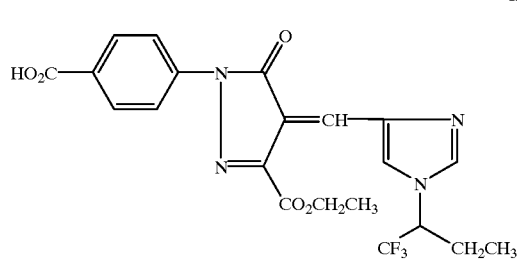
II-9
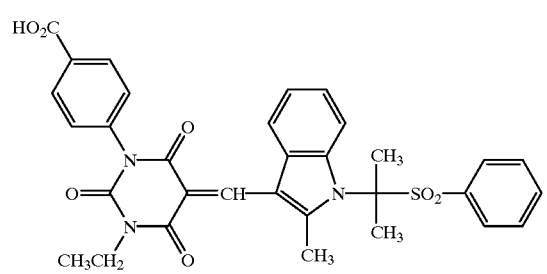
II-10
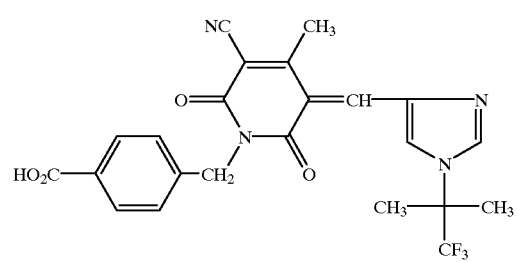
II-11
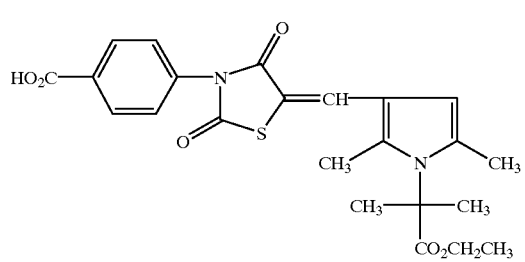
II-12
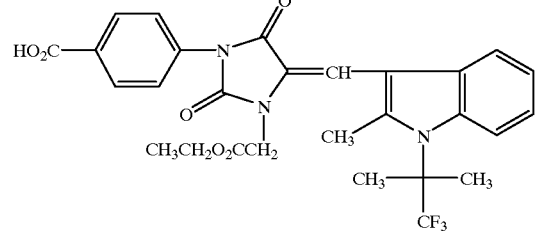
III-1
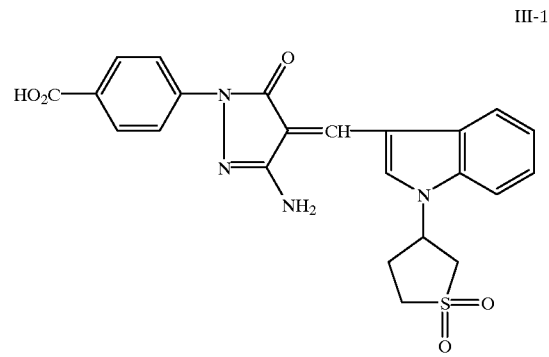
III-2
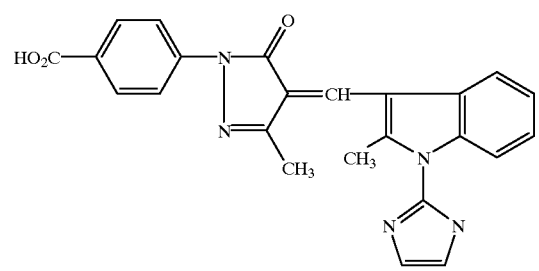
III-3
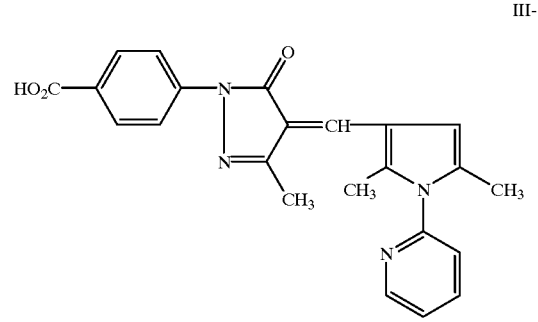
III-4
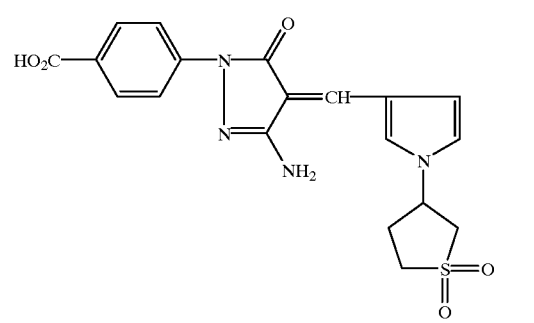

III-5
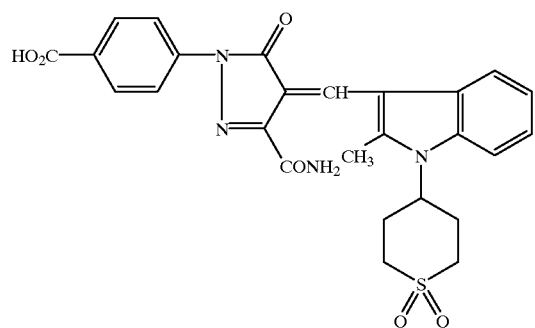
III-10
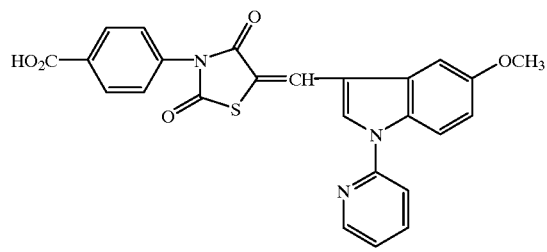
III-6
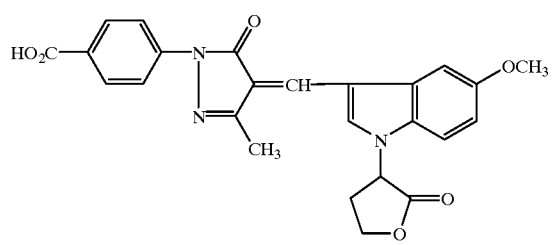
III-11
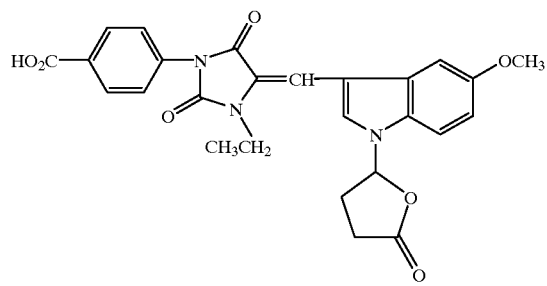
III-7
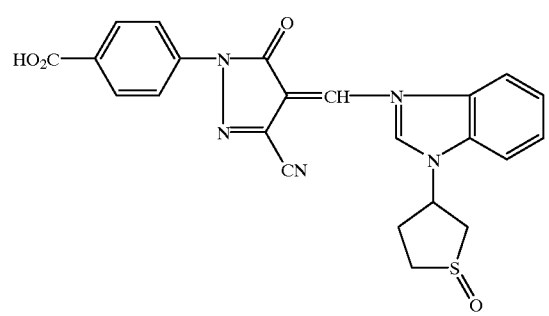
III-12
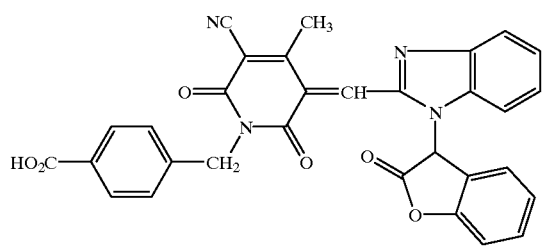
III-8
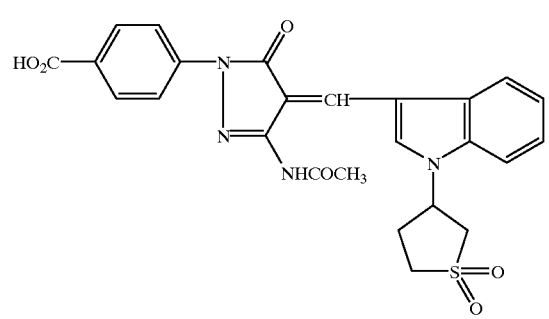
III-13
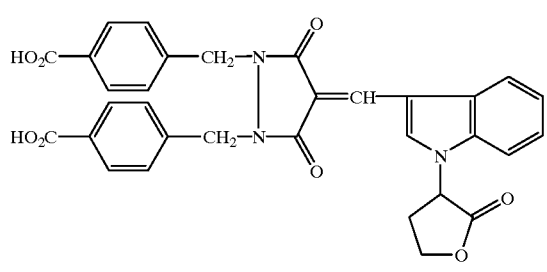
III-9
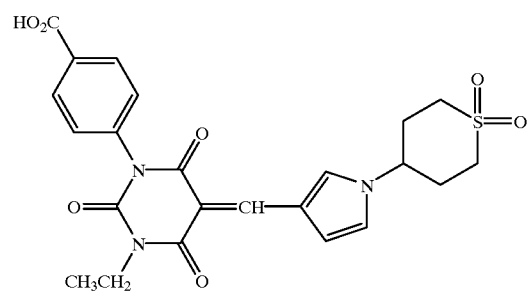
The compounds used in the present invention can be synthesized by employing synthetic methods described in JP-A No. 52-92716, 55-120030, 55-155350, 55-155351, 56-12639, 63-197943, 2-1838, 2-1839, World Patent WO No. 88/04794, U.S. Pat. Nos. 4,861,700, 4,950,586, European Patent Publication No. 489,973. Synthetic examples of the compounds used in the present invention will be shown below.
Synthetic Example 1 (Synthesizing Exemplified Compound I-1)

Synthesizing Exemplified Compound I-1

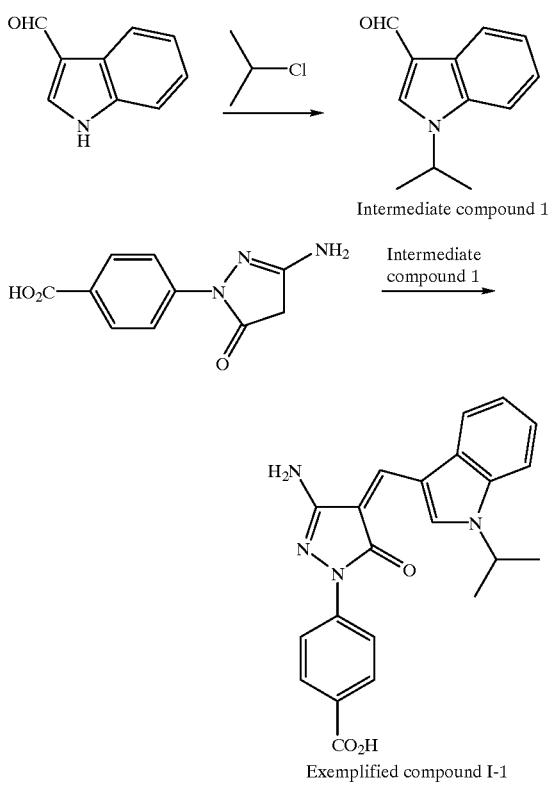

Exemplified compound I-1

Synthetic Example 2 (Synthesizing Exemplified Compound II-1)

Synthesizing Exemplified Compound II-1

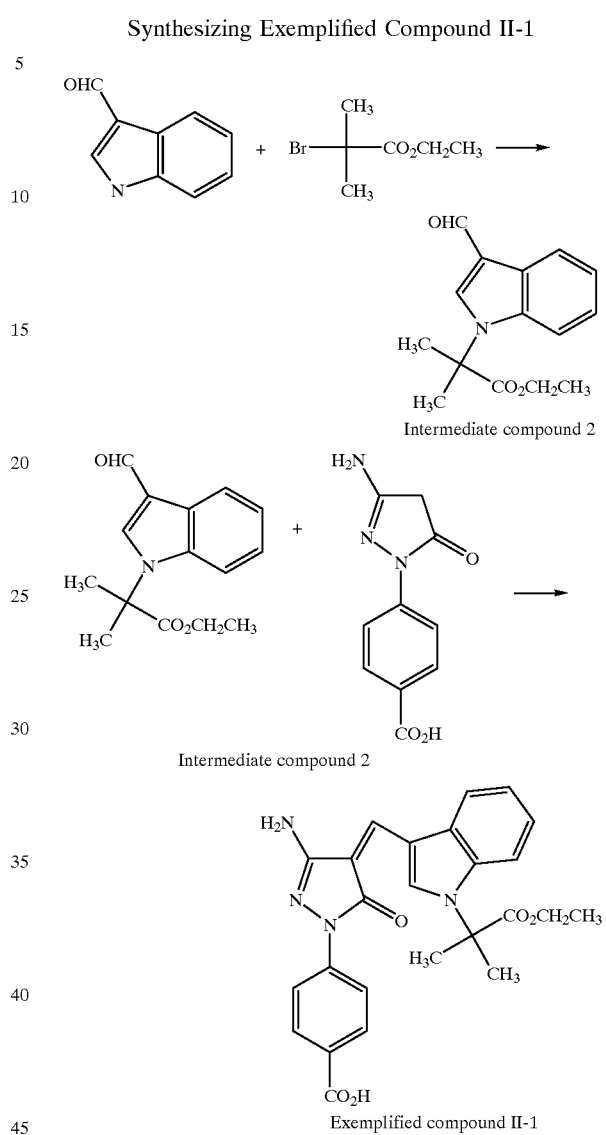

Exemplified compound II-1

(1) 27 g of 2-chloropropane and 29 g of indole-3-aldehyde were dissolved in 50 ml of N,N-dimethylformamide and to thus obtained solution was added 24.0 g of potassium carbonate, then the above obtained solution was stirred upon heating at 70° C. for 8 hours, thereafter the solution was allowed to cool down. The reaction mixture was poured into water and organic compounds were extracted using ethyl acetate. The separated organic phase was washed with water and dried with magnesium sulfate and concentrated, thereafter the concentrated solution was purified through a column chromatography. Each solution containing a target compound was collected and concentrated so as to obtain slightly yellowish crystals which were recrystallized from 20 ml of ethyl acetate to produce 18 g of an intermediate compound 1 of which chemical structure was confirmed by NMR spectrum and mass spectrum.

(2) 5.3 g of the intermediate compound 1 and 5.5 g of 3-amino-1-(p-carboxyphenyl)-2-pyrazoline-5-one were added in 30 ml of methanol and thus obtained solution was stirred at the refluxing temperature. After stirred for 3 hours, the solution was allowed to cool down so as to produce crystals which were filtered and purified with 30 ml of methanol and dried to produce 9.0 g of the exemplified compound I-1 of which chemical structure was confirmed by NMR spectrum and mass spectrum.

(1) 6.88 g of ethyl α-bromoisobutylate and 2.5 g of indole-3-aldehyde were dissolved in 20 ml of N,N-dimethylformamide and to thus obtained solution was added 3.8 g of potassium carbonate, then the above obtained solution was stirred upon heating at 70° C. for 3 hours, thereafter the solution was allowed to cool down. The reaction mixture was poured into water and organic compounds were extracted using ethyl acetate. The separated organic phase was washed with water and dried with magnesium sulfate and concentrated, thereafter the concentrated solution was purified through a column chromatography so as to obtain 3.66 g of slightly brownish crystals of an intermediate compound 2 of which chemical structure was confirmed by NMR spectrum, IR spectrum and mass spectrum.

(2) 3.5 g of the intermediate compound 2 and 2.7 g of 3-amino-1-(p-carboxyphenyl)-2-pyrazoline-5-one were added in 30 ml of N,N-dimethylformamide and thus obtained solution was stirred upon heating at 90° C. After stirred for 3 hours, insoluble compounds were filtered out and washed with small amount of N,N-dimethylformamide. The filtrate was poured into 200 ml of water so as to produce crystals, and thus precipitated crystals were collected by filtration so as to obtain 3.3 g of the exemplified compound II-1 of which chemical structure was confirmed by NMR spectrum, IR spectrum and mass spectrum.

Synthetic Example 3 (Synthesizing Exemplified Compound III-1)

Synthesizing Exemplified Compound III-1

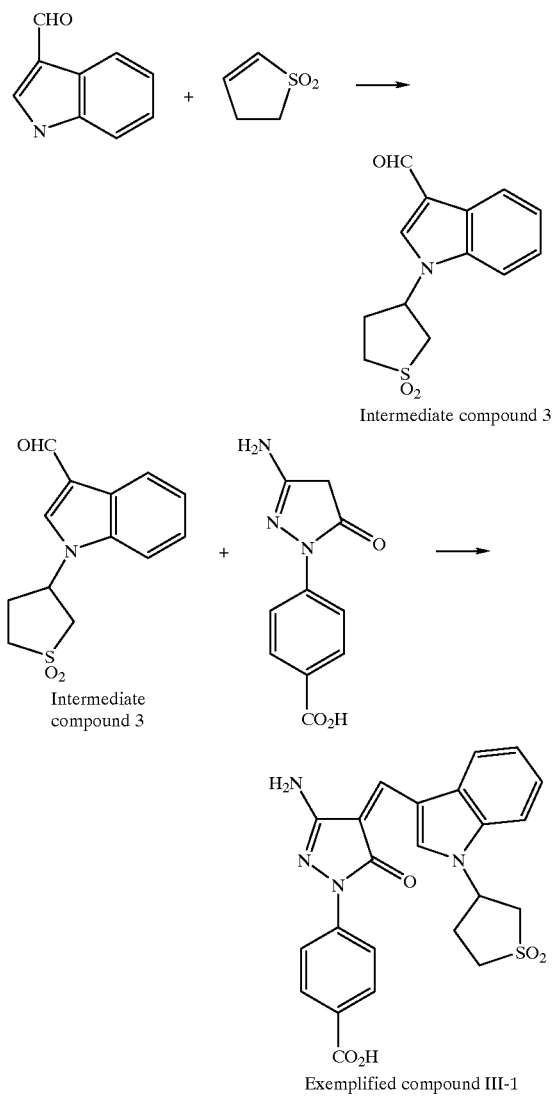

(1) 5.92 g of indole-3-aldehyde and 12.1 g of sulfolene were dissolved in 50 ml of N,N-dimethylformamide and to thus obtained solution was added 6.92 g of potassium carbonate, then the above obtained solution was stirred upon heating at 80° C. for 8 hours, thereafter the solution was allowed to cool down. The reaction mixture was poured into water and stirred so as to produce solid crystals. Thus obtained solid crystals were collected by filtration and stirred in methanol upon heating so that the solid crystals were washed to be purified. Thus, 6.8 g of yellowish crystals of the intermediate compound 3 of which chemical structure was confirmed by NMR spectrum, IR spectrum and mass spectrum were obtained.

(2) 5.8 g of the intermediate compound 3 and 6.42 g of 3-amino-1-(p-carboxyphenyl)-2-pyrazoline-5-one were dissolved in 150 ml of N,N-dimethylformamide and thus obtained solution was stirred upon heating at 80° C. After stirred for 4 hours, insoluble compounds were filtered out and 500 ml of water was poured into the filtrate, and precipitated crystals were collected by filtration so as to obtain 6.0 g of the orange crystals of the exemplified compound III-1 of which chemical structure was confirmed by NMR spectrum, IR spectrum and mass spectrum.

The dye used in the invention is added into a hydrophilic colloidal solution in the form of fine solid particle dispersion. As methods for producing the fine solid particle dispersion, are cited the methods described in JP-A Nos. 52-92716, 55-155350, 55-155351, 63-197943, 3-182743, World Patent WO No. 88/04794, etc. Concretely, using a surfactant, the fine solid particle dispersion can be prepared employing a fine dispersing homogenizer such as ball mill, vibration mill, planet mill, sand mill, roller mill, jet mill, disc impeller mill, etc. Furthermore, the fine solid particle dispersion of the dye can be obtained by the method of dissolving the dye in a weak alkaline aqueous solution and then lowering pH to weak acidity so as to precipitate fine particle solid, or by the method of simultaneously mixing a weak alkaline aqueous solution containing the dye and an acidic aqueous solution by adjusting pH so as to produce fine particle solid. The dye may be used singly or in combination of two or more kinds. In cases where two or more kinds of dyes are used in combination, each dye may be singly dispersed and then mixed with other dispersed dye, and several dyes can be simultaneously dispersed.

A particle size of the fine solid particles used in the present invention is represented by so-called sphere equivalent diameter. Concretely, the particle size can be measured with System 4700 (produced by Malvern Instrument Co.). As the particle size of the fine particles of the dye becomes finer, an absorbance of the dye per coating amount of the dye becomes larger. However, when the particle size is extremely fine, a problem such as aggregation, etc. is critical in dispersing it in a solution such as aqueous gelatin solution, etc. When the particle size is large, an effective density as an optical filter in a layer of the lightsensitive material in which the fine particle dispersion is added is lowered, and dissolving rate or leaching rate of the dye from the lightsensitive material is retarded in development process, and shielding effect to an exposing light and flatness of a lightsensitive layer accept occasionally unpreferable affection. An average particle size of the dye dispersed in the form of fine solid particle according to the invention is preferably not more than 0.4 $\mu$m, more preferably 0.01 to 0.3 $\mu$m, specifically preferably 0.10 to 0.25 $\mu$m.

Variation coefficient of particle size distribution of the fine solid particle dispersion is preferably not more than 50%, more preferably not more than 40%, specifically preferably not more than 30%. Herein, the variation coefficient of particle size distribution is represented by the following formula.

Standard variation of particle size)/(average value of particle size)×100

In preparing a fine solid particle dispersion of said dye, a surfactant may be used, as the surfactant is usable any of an anionic surfactant, a nonionic surfactant, a cationic surfactant and an ampholytic surfactant. There are preferably used anionic surfactants such as alkylsulfonates, alkylbenzenesulfonates, alkylnaphthalenesulfonates, alkyl-sulfuric acid esters, sulfosuccinic acid esters, sulfoalkylpolyoxyethylene alkylphenyl ethers and N-acyl-N-alkyltaurines, and nonionic surfactants such as saponin, alkyleneoxide derivatives and alkylesters of saccharide.

The surfactant can be added at an arbitrary stage prior to the start of dispersing the dye, during dispersing the dye or after dispersing the dye, but it is preferably added prior to the start of dispersing the dye, and if necessary, further added after dispersing. The anionic surfactant and/or the nonionic surfactant can be used singly, in combination of two kinds or more of each surfactant or in combination of both kinds of surfactants. The amount of the anionic surfactant/nonionic surfactant to be used depends on the kind of the surfactant or conditions for dispersing the dye, and is conventionally 0.1 to 2000 mg, preferably 0.5 to 1000 mg and more preferably 1 to 500 mg per 1 g of a dye. Alternatively, the surfactant is used in an amount of 0.01 to 10% by weight and preferably 0.1 to 5% by weight in the dye dispersion.

To the dye dispersion of the present invention can be added a hydrophilic colloid used as a binder of a photographic construction layer prior to the dispersion or after the dispersion. As the hydrophilic colloid, gelatin is advantageous, further gelatin derivatives such as phenylcarbamyl modified gelatin, acylated gelatin and phthalated gelatin, grafted polymer derived through reaction of gelatin with monomer having ethylene group capable of polymerization reaction with gelatin, cellulose derivatives such as carboxymethylcellulose, hydroxymethylcellulose and cellulosesulfuric acid ester, synthetic hydrophilic polymers such as polyvinylalcohol, partially oxidized polyvinylacetate, polyacrylamide, poly-N,N-dimethylacrylamide, poly-N-vinylpyrrolidone, and polymethacrylic acid, agar, gum arabi, alginic acid, albumin, casein, etc. can be used. These can be used in combination of two kinds or more.

The dispersion of the dye according to the present invention can be used in a lightsensitive emulsion layer constituting the photographic lightsensitive material and in a nonlightsensitive hydrophilic colloidal layer such as an upper layer on an emulsion layer, an under layer under an emulsion layer, a protective layer, a sub layer of a support and a backing layer. Preferable using amount of the dye is, depending on the kind of the dye and characteristic of the photographic material, 1 to 1000 mg, more preferably 3 to 500 mg, specifically preferably 5 to 100 mg. The dye is added into the photographic lightsensitive material in an amount so that optical density is 0.05 to 3.0 in response to intended purpose.

In the photographic lightsensitive material of the invention, the fine solid particle dispersion of the dye may be contained in at least one lightsensitive hydrophilic colloidal layer or nonlightsensitive hydrophilic colloidal layer. As a hydrophilic colloid, gelatin is preferable, and coating amount of gelatin is preferably 0.01 to 2.0 g/m², more preferably 0.05 to 1.7 g/m², most preferably 0.1 to 1.4 g/m².

Gelatin used in the photographic lightsensetive material according to the present invention is produced from ox bone, ox hide and pig hide, and in manufacturing the gelatin from collagen, there are alkali processed gelatin treated with lime, etc. and acid processed gelatin treated with hydrochloric acid, etc. Both types of gelatin are used in the present invention. Details of manufacturing method and property, etc. of these gelatin are described in "The Macromolecular Chemistry of Gelatin" edited by Arthur Veis, page 187 through page 217 (1964) (published by Academic Press); "The Theory of the Photographic Process" edited by T. H. James, 4th edition, page 55 (1977) (published by Macmillan); "Glue and gelatin" published by Japan Glue and Gelatin Industrial Association (1987); "Shashin Kogakunokiso, Ginen Shashinhen (Foundation of Photographic Engineering, Silver Halide Photography)", page 119 through page 124 (published by Corona Co.). Jelly strength of gelatin (according to PAGI method) is preferably not less than 250 g. Calcium content (according to PAGI method) of the gelatin used in the present invention is preferably not more than 4000 ppm, specifically preferably not more than 3000 ppm.

Further, gelatin is hardened by a hardener, and degree of swell of a coated layer and intensity of a layer can be adjusted by using amount of the hardener in the photographic lightsensitive material. As hardeners, can be used organic hardeners such as aldehydes (formaldehyde, glyoxal, glutaraldehyde, etc.), mucohalogenic acids (mucochloric acid, mucophenoxychloric acid), epoxycompounds, active halogen containing compounds (2,4-dichloro-6-hydroxy-s-triazine, etc.), active vinyl group containing derivatives (1,3,5-triacryloylhexahydro-s-triazine, bis (vinylsulfonyl)methylether, N, N'-methylenebis (β-vinylsulfonyl(propioneamide), etc.), ethyleneimines, carbodiimides, methanesulfonic acid esters and isoxazoles, inorganic hardeners such as chromium alum, etc. and high molecular hardeners described in U.S. Pat. Nos. 3,057,723, 3,396,029, 4,161,407. These hardeners can be used singly or in combination of two or more kinds. Swelling ratio of the coating layer of the photographic lightsensetive material of the present invention in processing solution is preferably 150 to 250% and thickness after swelling is preferably not more than 70 μm. The swelling ratio is obtained by dividing the difference between the thickness of the photographic lightsensetive material swelled in each processing solution and the thickness prior to development process by the thickness prior to development process and multiplying thus obtained value by 100. When the swelling ratio is more than 250%, drying failure occurs, and when the swelling ratio is less than 150%, development unevenness and color stain tend to deteriorate.

Other emulsions used in the present invention described in Research Disclosure (hereinafter referred to as RD) 308119 can be used.

Disclosed locations are shown below.

| Item | RD-308119 |
| --- | --- |
| Iodide content | 993 I-A |
| Manufacturing method | 993 I-A |
|  | 994 E |
| Crystal habit, normal crystal | 994 E |
| Crystal habit, twinned crystal | 994 E |
| Epitaxial | 994 E |
| Halogen composition, uniformity | 993 I-B |
| Halogen composition, not uniformity | 993 I-B |
| Halogen conversion | 994 I-C |
| Halogen substitution | 994 I-C |
| Contained metal | 995 I-D |
| Monodispersion | 995 I-F |
| Addition of solvent | 995 I-F |
| Latent image forming location, surface | 995 I-G |
| Latent image forming location, interior | 995 I-G |
| Applied lightsensitive material, negative | 995 I-H |
| Applied lightsensitive material, positive (including interior fogged grain) | 995 I-H |
| Mixing emulsions | 995 I-J |
| Desalting | 995 II-A |

In the present invention, a silver halide emulsion subjected to physical ripening, chemical ripening and spectral sensitizing according to the present invention is used. Additives used in these process are described in RD Nos. 17643, 18716 and 308119. Disclosed locations are shown below.

TABLE 1

| Item | RD 308119 | RD 17643 | RD 18716 |
|---|---|---|---|
| Chemical sensitizer | 996 III-A | 23 | 648 |
| Spectral sensitizer | 996 IV-A-A, B, C, D, E to J | 23, 24 | 648, 649 |
| Supersensitizer | 996 IV-A to E, J | 23, 24 | 648, 649 |
| Antifoggant | 998 IV | 24, 25 | 649 |
| Stabilizer | 998 IV | | |

TABLE 2

| Item | RD 308119 | RD 17643 | RD 18716 |
|---|---|---|---|
| Anticolor contamination agent | 1002 VII-I | 25 | 650 |
| Color image stabilizer | 1001 VII-J | 25 | |
| Brightening agent | 998 V | 24 | |
| Ultraviolet rays absorbing agent | 1003 VIII-C, XIII-C | 25, 26 | |
| Light absorbing agent | 1003 VIII | 25, 26 | |
| Light scattering agent | 1003 VIII | | |
| Filter dye | 1003 VIII | 25, 26 | |
| Binder | 1003 IX | 26 | 651 |
| Antistatic agent | 1006 XIII | 27 | 650 |
| Hardener | 1004 X | 26 | 651 |
| Plasticizer | 1006 XII | 27 | 650 |
| Lubricant | 1006 XII | 27 | 650 |
| Matting agent | 1007 XVI | | |
| Developer (incorporated in lightsensitive material) | 1011 XXB | | |

Various kinds of couplers can be used in the present invention and exemplified couplers are described in the above mentioned RD. Related locations are shown below.

TABLE 3

| Item | RD 308119 | RD 17643 |
|---|---|---|
| Yellow coupler | 1001 VII-D | VIIC to G |
| Magenta coupler | 1001 VII-D | VIIC to G |
| Cyan coupler | 1001 VII-D | VIIC to G |
| Colored coupler | 1002 VII-G | VIIG |
| BAR coupler | 1002 VII-F | |
| Photographically useful group releasing coupler | 1001 VII-F | |
| Alkali soluble coupler | 1001 VII-E | |

The photographic lightsensitive material of the present invention may contain at least one silver halide lightsensitive emulsion layer and at least one nonlightsensitive hydrophilic colloidal layer on a one side of a support, and may contain said emulsion layers and said colloidal layers on both sides of the support. As the photographic lightsensitive materials, are cited a color negative photographic material, a color reversal photographic material, a color paper photographic material, a medical X ray photographic material, a print and plate-making photographic material, a direct positive photographic material, a thermally developable photographic material, a diffusion transfer color photographic material, etc.

Various techniques and additives known in this art, if necessary, can be used in the silver halide photographic lightsensitive material of the present invention. For example, photographic construction layer such as a silver halide lightsensitive emulsion layer, a protective layer, an intermediate layer, a filter layer, an antihalation layer, a cross over cut layer and a backing layer, etc. can be provided. In these layers can be contained supersensitizer, coupler, high boiling solvent, antifoggant, stabilizer, development inhibitor, bleach accelerator, fixation accelerator, anticolorcontamination agent, formalin scavenger, toner, hardener, surfactant, viscosity increasing agent, plasticizer, lubricant, ultraviolet rays absorbing agent, polymer latex, antistatic agent and matting agent according to the dispersing method described in RD 308119 XIV and the like.

As supports usable in the silver halide photographic lightsensitive material of the present invention, polyester such as cellulose triacetate, cellulose nitrate, polyethylenenaphthalate and polyethyleneterephthalate, polyolefin such as polyethylene, polystyrene, baryta paper, paper laminated with polyethylene, glass and metal, etc. can be used. In order to improve adhesiveness of the surface of these supports, on these supports are coated a sublayer and, if necessary, these supports are subjected to corona discharge and ultraviolet radiation.

On the photosensitive material of the present invention may be coated a magnetic recording layer in order to input kind and manufacturing number of the photographic lightsensitive material, name of manufacturer, emulsion number, and various information of the photographic lightsensitive material, for example, photographing date, time, aperture, exposure time, condition of irradiation, used filter, weather, size of photographing frame, kind of photographing apparatus, and further various information when taking a picture with a camera using an anamorphic lens, for example, number of print, selection of filter, client's needs, trimming frame, etc.

In the present invention, the magnetic recording material is preferably coated on another side of a support opposite to the photographic construction layers. It is preferable that a sublayer, an antistatic layer (electric conductive layer), a magnetic recording layer and a lubricant layer are coated in this order from the support.

The photographic material of the present invention is processed according to methods known in this art, for example, various kinds and various solutions described in RD 17643 can be used.

EXAMPLES

The present invention is explained with reference to examples below. However, the present invention is not limited to these examples.

Example 1

(Preparation of Fine Solid Particle Dispersions)

Fine solid particle dispersions of the dyes of the present invention and comparative dyes were produced as follows. 100 g of each powder of these dyes and a surfactant, Triton X-200 (produced by Rohm & Haas Co., the surfactant was added so that the solid component of the surfactant is 10 g) were added in 1000 ml of water. After predispersion, the above obtained solution was dispersed for 20 hours using zirconium oxide beads having diameter of 0.5 mm employing Mitsubishi Diamond Fine Mill MD-2M. Thereafter, the zirconium oxide beads were filtered out so as to obtain the solid fine particle dispersions. An average particle size of the above obtained solid fine particle dispersions was measured employing System 4700 produced by Malvern Instrument Co.

The kind and average particle size of the above prepared fine solid particle dispersions are shown in Table 4.

TABLE 4

| Dispersion | Kind of compound (cpd.) | Average particle size (nm) | Remarks |
|---|---|---|---|
| Dispersion A | Exemplified cpd. I-1 | 400 | Inv. |
| Dispersion B | Exemplified cpd. I-1 | 260 | Inv. |
| Dispersion C | Exemplified cpd. I-1 | 170 | Inv. |
| Dispersion D | Exemplified cpd. I-13 | 380 | Inv. |
| Dispersion E | Exemplified cpd. I-13 | 190 | Inv. |
| Dispersion F | Exemplified cpd. I-21 | 180 | Inv. |
| Dispersion G | Exemplified cpd. I-31 | 210 | Inv. |
| Dispersion H | Exemplified cpd. I-38 | 170 | Inv. |
| Dispersion I | Exemplified cpd. II-1 | 150 | Inv. |
| Dispersion J | Exemplified cpd. II-11 | 200 | Inv. |
| Dispersion K | Exemplified cpd. III-1 | 140 | Inv. |
| Dispersion L | Exemplified cpd. III-13 | 210 | Inv. |
| Dispersion M | Comparative cpd. a | 210 | Comp. |
| Dispersion N | Comparative cpd. b | 230 | Comp. |
| Dispersion O | Comparative cpd. c | 250 | Comp. |
| Dispersion P | Comparative cpd. d | 240 | Comp. |

Inv.; Invention;
Comp.; Comparison

The comparative compounds a, b, c and d are shown below.

Comparative compound a (exemplified compound 8 described in U.S. Pat. No. 5,213,957)

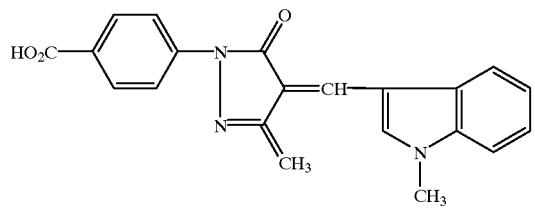

Comparative compound b (exemplified compound 5 described in U.S. Pat. No. 5,665,528)

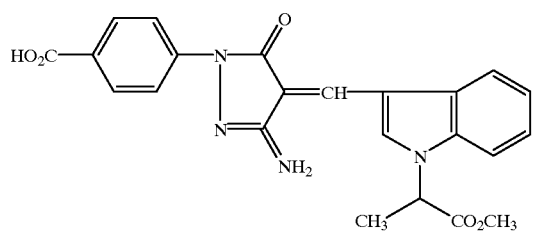

Comparative compound c (exemplified compound 6 described in JP-A No. 3-208046)

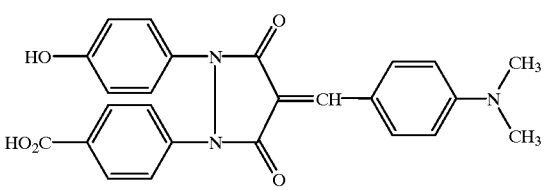

Comparative compound d (exemplified compound 1 described in U.S. Pat. No. 4,923,788)

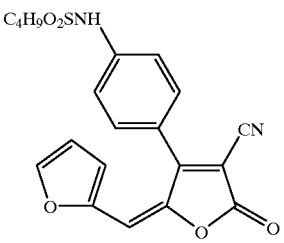

Each of the fine solid particle dispersions prepared according to the above-mentioned method mixed with a gelatin aqueous solution was coated on a triacetylcellulose film on which was previously coated a sublayer so as to obtain sample 101 to sample 116 each containing the dye in an amount of 0.3 g/m².

The samples 101 to 116 were immersed in a color developer at the solution temperature of 37° C. for 1 minute and ultraviolet and visible spectrum of each sample before and after the immersion were measured. From the difference of absorbance at absorption maximum wavelength before and after the immersion, decoloring ratio was obtained. Herein, the decoloring ratio was defined by the following formula.

Decoloring ratio=$((E_1-E_2)/E_1) \times 100$ wherein, $E_1$ represents the absorbance before the immersion and $E_2$ represents the absorbance after the immersion. A composition of the color developer is shown below.

(Composition of Color Developer)

| Water | 800 ml |
|---|---|
| Potassium carbonate | 30 g |
| Sodium hydrogen carbonate | 2.5 g |
| Potassium sulfite | 3.0 g |
| Sodium bromide | 1.3 g |
| Potassium iodide | 1.2 mg |
| Hydroxylamine sulfate | 2.5 g |
| Sodium chloride | 0.6 g |
| 4-amino-3-methyl-N-ethyl-N-(β-hydroxyethyl)aniline sulfate | 4.5 g |
| Diethylenetriaminepentaacetic acid | 3.0 g |
| Potassium hydroxide | 1.2 g |
| Water to make | 1 l |

Adjust pH to 10.06 by using potassium hydroxide or 20% sulfuric acid.

Furthermore, the above mentioned samples 101 to 116 were immersed in a buffer solution of pH=7.0 at the solution temperature of 37° C. for 90 seconds so as to obtain a fixing ratio calculated from the difference of absorbance before and after the immersion. Herein, the fixing ratio is an index of nondiffusibility of the dye and defined by the following Formula.

Fixing ratio=$(E_4/E_3) \times 100$ wherein, $E_3$ represents the absorbance before the immersion and $E_4$ represents the absorbance after the immersion.

Thus obtained decoloring ratio and fixing ratio of samples 101 to 116 are shown together with maximum spectral absorption wavelength (λmax) in Table 5. Further, when maximum absorbance represents 1.0, relative absorbance (ABS500) at 500 nm is also listed in Table 5.

TABLE 5

| Sample No. | Dispersion | Decoloring ratio (%) | Fixing ratio (%) | λ max (nm) | ABS500 | Remarks |
|---|---|---|---|---|---|---|
| 101 | A | 94 | 100 | 416 | 0.07 | Invention |
| 102 | B | 100 | 97 | 416 | 0.05 | Invention |
| 103 | C | 100 | 96 | 416 | 0.04 | Invention |
| 104 | D | 95 | 100 | 421 | 0.06 | Invention |
| 105 | E | 98 | 100 | 420 | 0.05 | Invention |
| 106 | F | 98 | 94 | 430 | 0.05 | Invention |
| 107 | G | 100 | 95 | 448 | 0.03 | Invention |
| 108 | H | 100 | 93 | 425 | 0.06 | Invention |
| 109 | I | 99 | 98 | 425 | 0.07 | Invention |
| 110 | J | 100 | 94 | 408 | 0.03 | Invention |
| 111 | K | 99 | 97 | 421 | 0.07 | Invention |
| 112 | L | 98 | 93 | 403 | 0.03 | Invention |
| 113 | M | 91 | 93 | 452 | 0.10 | Comparison |
| 114 | N | 93 | 92 | 415 | 0.15 | Comparison |
| 115 | O | 94 | 91 | 430 | 0.15 | Comparison |
| 116 | P | 85 | 90 | 428 | 0.13 | Comparison |

As can be seen from Table 5, the dyes of the present invention are excellent in decoloring ability and nondiffusibility compared with the comparative dyes. Furthermore, the spectral absorption of the dyes of the present invention is smaller in the spectral sensitivity region of a green lightsensitive emulsion than that of comparative yellow filter dyes so that sensitivity of a green lightsensitive layer does not tend to decrease.

Example 2

Each layer having the following composition was coated on a triacetylcellulose film on which was coated a sublayer in the following order from the support so as to obtain a multilayer color photographic lightsensetive material sample 200.

An adding amount shows g per 1 m² unless otherwise specified. The amount of silver halide and yellow colloidal silver is described in terms of silver amount. The amount of sensitizing dyes shows mole per 1 mole of silver.

Further, samples 201 to 216 were produced by replacing the colloidal silver in the 11th layer of sample 200 by the fine solid particle dispersions of the dyes shown in Table 6. An adding amount of the dyes is an amount by which the dyes show the same absorbance as the yellow colloidal silver.

First layer: Antihalation layer

| | |
|---|---|
| Black colloidal silver | 0.16 |
| Ultraviolet absorbent (UV-1) | 0.20 |
| High-boiling organic solvent (Oil-1) | 0.12 |
| Gelatin | 1.53 |

Second layer: Interlayer

| | |
|---|---|
| Anticolorcontamination agent (SC-1) | 0.06 |
| High-boiling organic solvent (Oil-2) | 0.08 |
| Gelatin | 0.80 |

Third layer: Low speed red-sensitive emulsion layer

| | |
|---|---|
| Silver iodobromide emulsion (Average grain size: 0.38 μm, silver iodide content: 8.0 mole %) | 0.43 |
| Silver iodobromide emulsion (Average grain size: 0.27 μm, silver iodide content: 2.0 mole %) | 0.15 |
| Sensitizing dye (SD-1) | $2.8 \times 10^{-4}$ |
| Sensitizing dye (SD-2) | $1.9 \times 10^{-4}$ |
| Sensitizing dye (SD-3) | $1.9 \times 10^{-4}$ |
| Sensitizing dye (SD-4) | $1.0 \times 10^{-4}$ |
| Cyan coupler (C-1) | 0.56 |
| Colored cyan coupler (CC-1) | 0.021 |
| DIR compound (D-1) | 0.025 |
| High-boiling solvent (Oil-1) | 0.49 |
| Gelatin | 1.14 |

Fourth layer: Medium speed red-sensitive emulsion layer

| | |
|---|---|
| Silver iodobromide emulsion (Average grain size: 0.52 μm, silver iodide content: 8.0 mole %) | 0.89 |
| Silver iodobromide emulsion (Average grain size: 0.38 μm, silver iodide content: 8.0 mole %) | 0.22 |
| Sensitizing dye (SD-1) | $2.3 \times 10^{-4}$ |
| Sensitizing dye (SD-2) | $1.2 \times 10^{-4}$ |
| Sensitizing dye (SD-3) | $1.6 \times 10^{-4}$ |
| Cyan coupler (C-1) | 0.45 |
| Colored cyan coupler (CC-1) | 0.038 |
| DIR compound (D-1) | 0.017 |
| High-boiling solvent (Oil-1) | 0.39 |
| Gelatin | 1.01 |

Fifth layer: High speed red-sensitive emulsion layer

| | |
|---|---|
| Silver iodobromide emulsion (Average grain size: 1.00 μm, silver iodide content: 8.0 mole %) | 1.27 |
| Sensitizing dye (SD-1) | $1.3 \times 10^{-4}$ |
| Sensitizing dye (SD-2) | $1.3 \times 10^{-4}$ |
| Sensitizing dye (SD-3) | $1.6 \times 10^{-4}$ |
| Cyan coupler (C-2) | 0.20 |
| Colored cyan coupler (CC-1) | 0.034 |
| DIR compound (D-3) | 0.001 |
| High-boiling solvent (Oil-1) | 0.57 |
| Gelatin | 1.10 |

Sixth layer: Interlayer

| | |
|---|---|
| Anticolorcontamination agent (SC-1) | 0.075 |
| High-boiling organic solvent (Oil-2) | 0.095 |
| Gelatin | 1.00 |

Seventh layer: Interlayer

| | |
|---|---|
| Gelatin | 0.45 |

Eighth layer: Low speed green-sensitive emulsion layer

| | |
|---|---|
| Silver iodobromide emulsion (Average grain size: 0.38 μm, silver iodide content: 8.0 mole %) | 0.38 |
| Silver iodobromide emulsion (Average grain size: 0.27 μm, silver iodide content: 2.0 mole %) | 0.13 |
| Sensitizing dye (SD-4) | $7.4 \times 10^{-4}$ |
| Sensitizing dye (SD-5) | $6.6 \times 10^{-4}$ |
| Magenta coupler (M-1) | 0.415 |
| Colored magenta coupler (CM-1) | 0.12 |
| High-boiling solvent (Oil-2) | 0.81 |
| Gelatin | 1.89 |

Ninth layer: Medium speed green-sensitive emulsion layer

| | |
|---|---|
| Silver iodobromide emulsion (Average grain size: 0.59 μm, silver iodide content: 8.0 mole %) | 0.46 |
| Sensitizing dye (SD-6) | $1.5 \times 10^{-4}$ |
| Sensitizing dye (SD-7) | $1.6 \times 10^{-4}$ |
| Sensitizing dye (SD-8) | $1.5 \times 10^{-4}$ |
| Magenta coupler (M-1) | 0.087 |
| Colored magenta coupler (CM-2) | 0.039 |
| DIR compound (D-2) | 0.021 |
| DIR compound (D-3) | 0.002 |
| High-boiling solvent (Oil-2) | 0.37 |
| Gelatin | 0.76 |

Tenth layer: High speed green-sensitive emulsion layer

| | |
|---|---|
| Silver iodobromide emulsion (Average grain size: 1.0 μm, silver iodide content: 8.0 mole %) | 0.88 |
| Sensitizing dye (SD-6) | $0.93 \times 10^{-4}$ |
| Sensitizing dye (SD-7) | $0.97 \times 10^{-4}$ |
| Sensitizing dye (SD-8) | $0.93 \times 10^{-4}$ |
| Magenta coupler (M-1) | 0.128 |
| Colored magenta coupler (CM-1) | 0.014 |
| High-boiling solvent (Oil-1) | 0.15 |
| High-boiling solvent (Oil-2) | 0.42 |
| Gelatin | 1.08 |

-continued

Eleventh layer: Yellow filter layer

| | |
|---|---|
| Yellow colloidal silver | 0.07 |
| Anticolorcontamination agent (SC-1) | 0.18 |
| Formalin scavenger (HS-1) | 0.14 |
| High-boiling solvent (Oil-2) | 0.21 |
| Gelatin | 0.73 |

Twelfth layer: Interlayer

| | |
|---|---|
| Formalin scavenger (HS-1) | 0.18 |
| Gelatin | 0.60 |

Thirteenth layer: Low speed blue-sensitive emulsion layer

| | |
|---|---|
| Silver iodobromide emulsion (Average grain size: 0.59 μm, silver iodide content: 8.0 mole %) | 0.073 |
| Silver iodobromide emulsion (Average grain size: 0.38 μm, silver iodide content: 3.0 mole %) | 0.16 |
| Silver iodobromide emulsion (Average grain size: 0.27 μm, silver iodide content: 2.0 mole %) | 0.20 |
| Sensitizing dye (S-9) | $2.1 \times 10^{-4}$ |
| Sensitizing dye (S-10) | $2.8 \times 10^{-4}$ |
| Yellow coupler (Y-1) | 0.89 |
| DIR compound (D-4) | 0.008 |
| High-boiling solvent (Oil-2) | 0.37 |
| Gelatin | 1.51 |

Fourteenth layer: High speed blue-sensitive emulsion layer

| | |
|---|---|
| Silver iodobromide emulsion (Average grain size: 1.0 μm, silver iodide content: 8.0 mole %) | 0.95 |
| Sensitizing dye (S-9) | $7.3 \times 10^{-4}$ |
| Sensitizing dye (S-10) | $2.8 \times 10^{-4}$ |
| Yellow coupler (Y-1) | 0.16 |
| High-boiling solvent (Oil-2) | 0.093 |
| Gelatin | 0.80 |

Fifteenth layer: First protective layer

| | |
|---|---|
| Silver iodobromide emulsion (Average grain size: 0.05 μm, silver iodide content: 3.0 mole %) | 0.30 |
| Ultraviolet absorbent (UV-1) | 0.094 |
| Ultraviolet absorbent (UV-2) | 0.10 |
| Formalin scavenger (HS-1) | 0.38 |
| High-boiling solvent (Oil-1) | 0.10 |
| Gelatin | 1.44 |

Sixteenth layer: Second protective layer

| | |
|---|---|
| Alkali soluble matting agent (average particle size: 2 μm) | 0.15 |
| Polymethyl methacrylate (average particle size: 3 μm) | 0.04 |
| Lubricant (WAX-1) | 0.02 |
| Gelatin | 0.55 |

Besides these compositions as mentioned above, coating auxiliary agent SU-1, dispersing auxiliary agent SU-2, viscosity adjusting agent, stabilizer ST-1, dye AI-1, AI-2, antifoggant AF-1, two kinds of polyvinylpyrrolidone (AF-2) consisting of weight average molecular weight of 10,000 and that of 1,100,000, antiseptic agent DI-1 and hardener H-2 were added. An adding amount of DI-1 was 9.4 mg/m².

The compounds used in the above-mentioned samples are shown below.

C-1

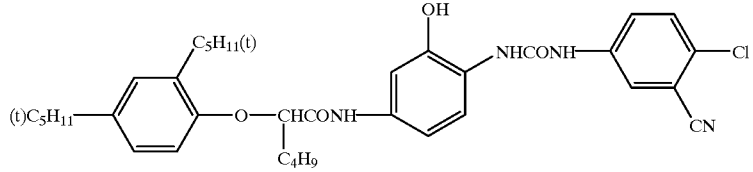

C-2

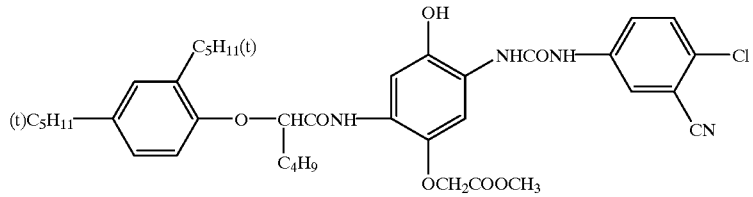

M-1

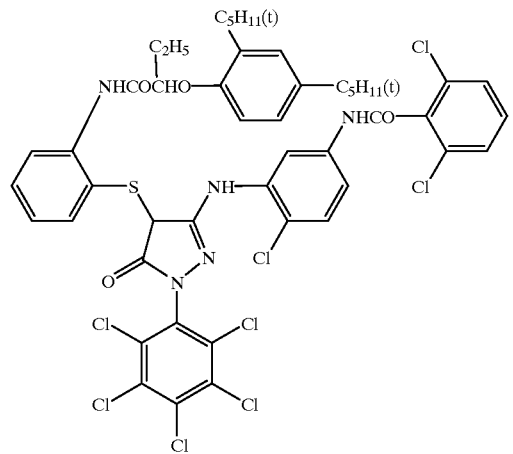

Y-1

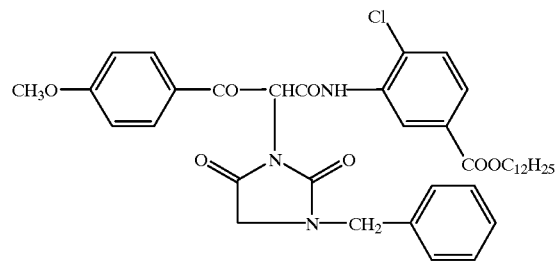

-continued
CC-1
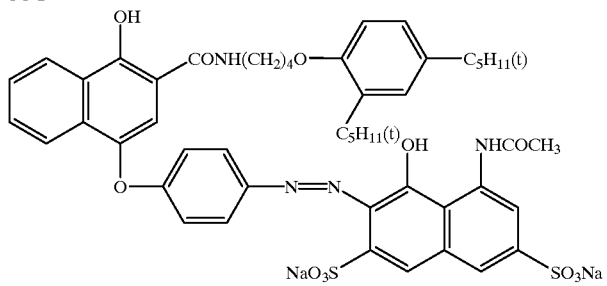
CM-1
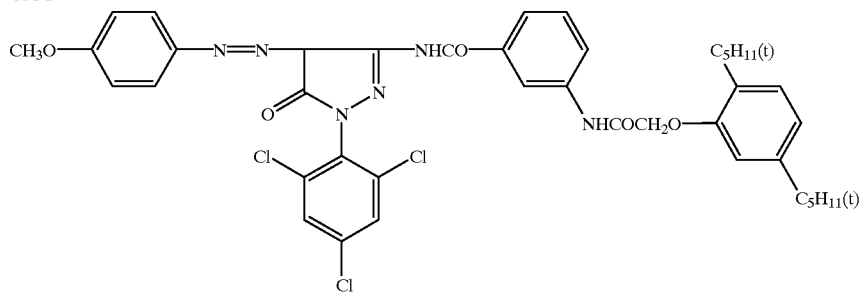
CM-2
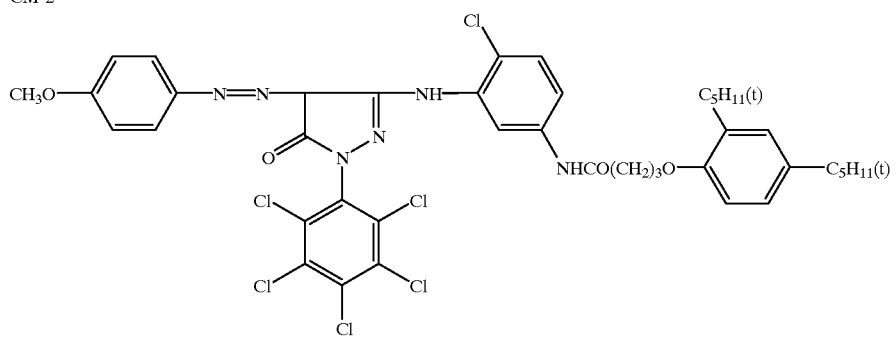
D-1
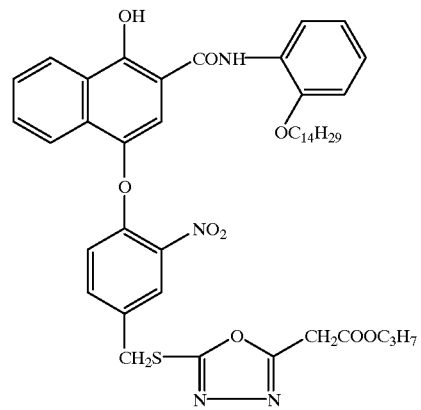
D-2
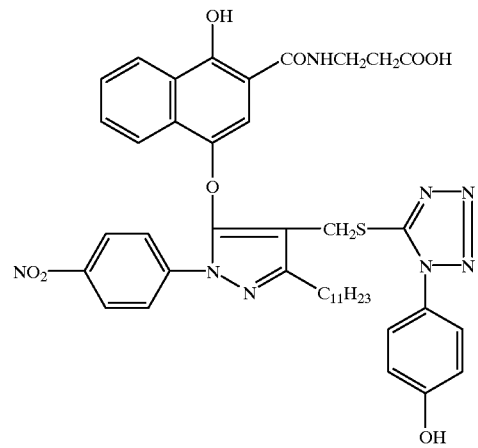

-continued
D-3
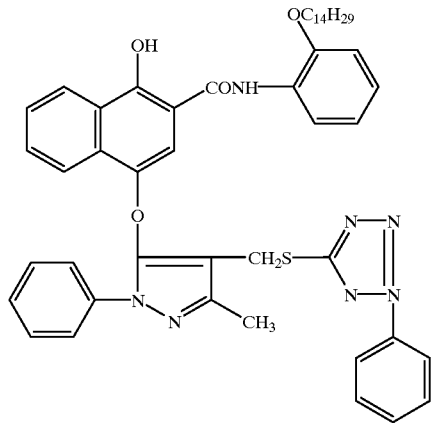
D-4
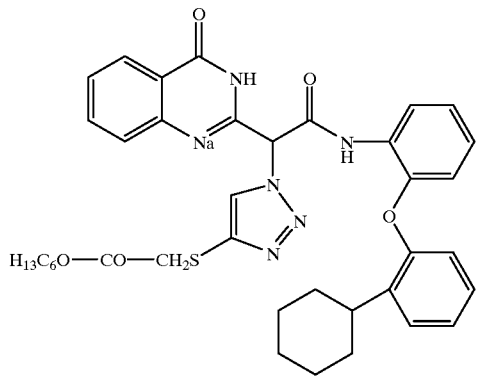
Oil-l1
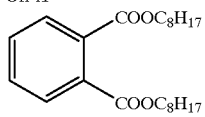
Oil-l2
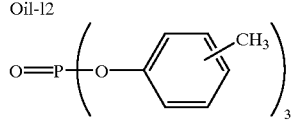
SC-1
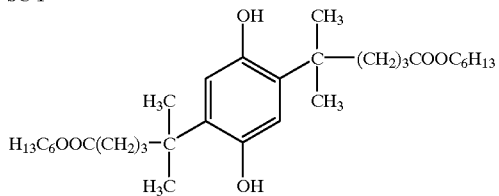
UV-1
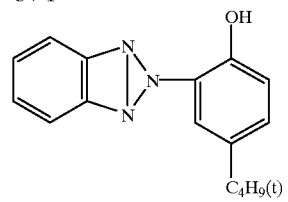
UV-2
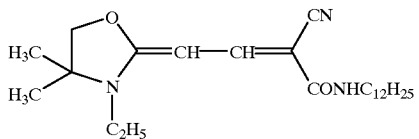
WAX-1
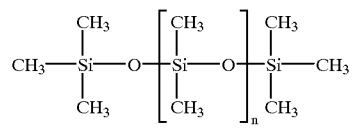
weight average molecular weight MW: 3,000
SU-1
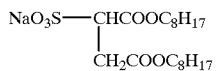
SU-2
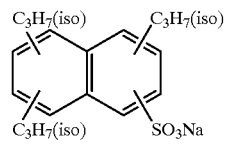
HS-1
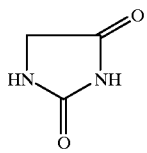
SD-1
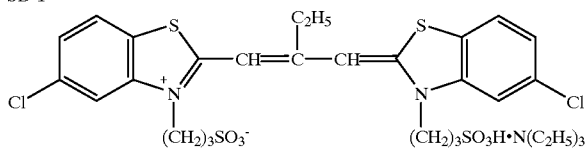
SD-2
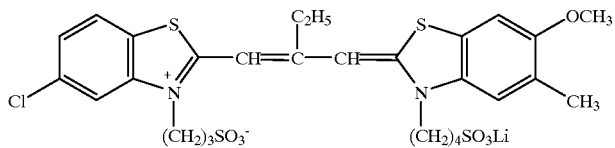

-continued
SD-3
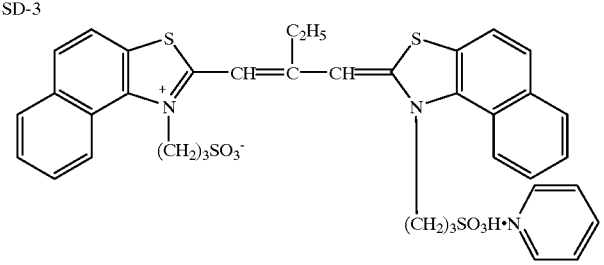
SD-4
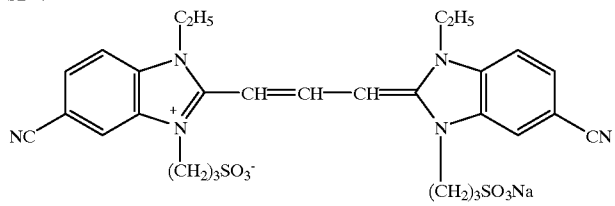
SD-5
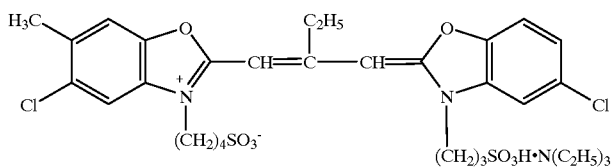
SD-6
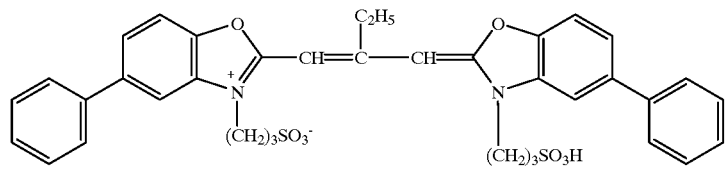
SD-7
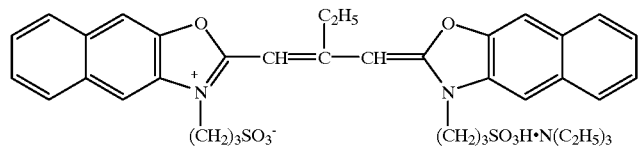
SD-8
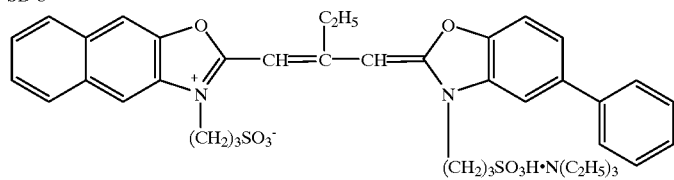
SD-9
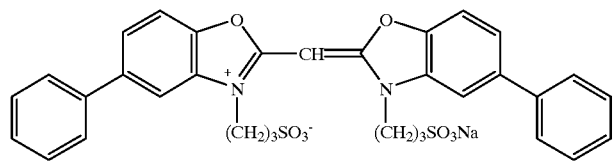
SD-10　　　　　　　　　　　　　　　　ST-1
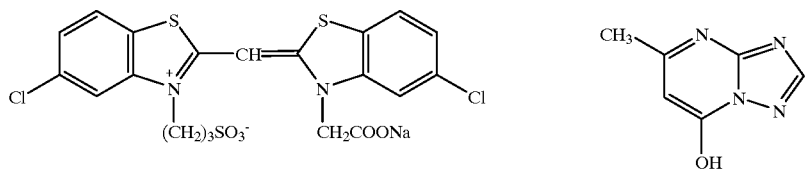

AF-1
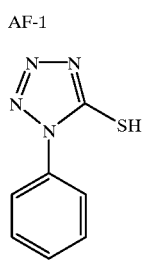

-continued

AF-2
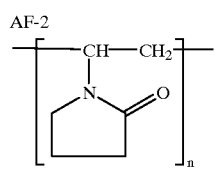

n: degree of polymerization

DI-1 (Mixture of the Following Three Components)

(component A)
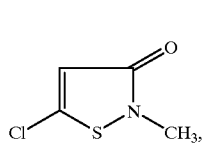

(component B)
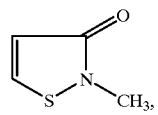

(component C)
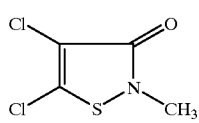

component A:component B:component C
= 50:46:4 (molar ratio)

AI-1
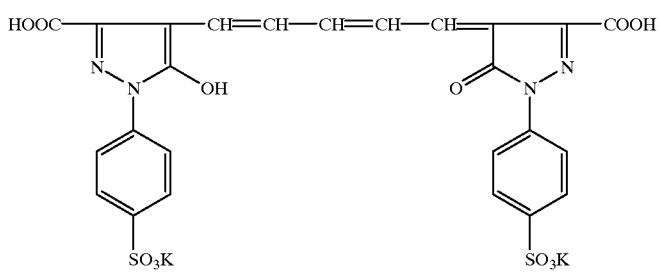

AI-2
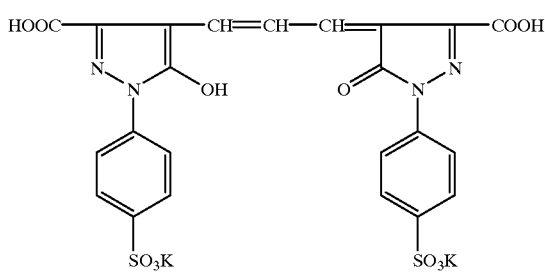

H-2
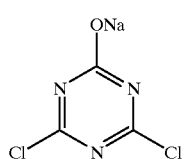

The fresh samples produced above were each exposed to white light through an optical wedge and processed according to the following processing procedure. Evaluation was made for checking the affection of the dyes to the sensitivity of a green lightsensitive layer (SG). Sensitivity was represented by a reciprocal of an amount of exposure giving a density of fog +0.3. Minimum yellow density of these samples was measured and this minimum yellow density represents the fog of a blue lightsensitive layer (DB1) and was compared.

Furthermore, other fresh samples were allowed to stand for 3 days under the condition of temperature of 50° C., relative humidity of 80%. Thus treated samples were exposed and processed according to the following processing procedure in similar manner to the above employed in processing the fresh samples. Sensitivity loss of the blue lightsensitive layer with passage of time is represented by ΔSB and compared. Herein, ΔSB is defined by the following formula.

ΔSB=(sensitivity of blue lightsensitive layer of stored sample)/(sensitivity of blue lightsensitive layer of fresh sample)×100

Color development process was carried out as follows.
(Processing Procedure)

| Processing | Time | Temperature | *Replenishing amount |
|---|---|---|---|
| Color developing | 3 min. 15 sec. | 38 ± 0.3° C. | 780 ml |
| Bleaching | 45 sec. | 38 ± 2.0° C. | 150 ml |
| Fixing | 1 min. 30 sec. | 38 ± 2.0° C. | 830 ml |
| Stabilizing | 60 sec. | 38 ± 5.0° C. | 830 ml |
| Drying | 60 sec. | 55 ± 5.0° C. | — |

(*Replenishing amount is an amount per 1 m² of the lightsensitive material.)

Composition of color developer is shown below.
[Prepation of Processing Solutions]
(Composition of Color Developer)

| Water | 800 ml |
|---|---|
| Potassium carbonate | 30 g |
| Sodium hydrogen carbonate | 2.5 g |
| Potassium sulfite | 3.0 g |
| Sodium bromide | 1.3 g |
| Potassium iodide | 1.2 mg |
| Hydroxylamine sulfate | 2.5 g |
| Sodium chloride | 0.6 g |
| 4-amino-3-methyl-N-ethyl-N-(β-hydroxyethyl)aniline sulfate | 4.5 g |
| Diethylenetriaminepentaacetic acid | 3.0 g |
| Potassium hydroxide | 1.2 g |
| Water to make | 1 l |

Adjust pH to 10.06 by using potassium hydroxide or 20% sulfuric acid.
(Composition of Color Development Replenisher)

| Water | 800 ml |
|---|---|
| Potassium carbonate | 35 g |
| Sodium hydrogen carbonate | 3 g |
| Potassium sulfite | 5 g |
| Sodium bromide | 0.4 g |
| Hydroxylamine sulfate | 3.1 g |
| 4-amino-3-methyl-N-ethyl-N-(β-hydroxyethyl)aniline sulfate | 6.3 g |
| Diethylenetriaminepentaacetic acid | 3.0 g |
| Potassium hydroxide | 2.0 g |
| Water to make | 1 l |

Adjust pH to 10.18 by using potassium hydroxide or 20% sulfuric acid.
(Composition of Bleaching Solution)

| Water | 700 ml |
|---|---|
| Ferric ammonium 1,3-diaminopropanetetraacetate | 125 g |
| Ethylenediaminetetraacetic acid | 2 g |
| Sodium nitrate | 40 g |
| Ammonium bromide | 150 g |
| Glacial acetic acid | 40 g |
| Water to make | 1 l |

Adjust pH to 4.4 by using ammonia water or glacial acetic acid.
(Composition of Bleaching Solution Replenisher)

| Water | 700 ml |
|---|---|
| Ferric ammonium 1,3-diaminopropanetetraacetate | 175 g |
| Ethylenediaminetetraacetic acid | 2 g |
| Sodium nitrate | 50 g |
| Ammonium bromide | 200 g |
| Glacial acetic acid | 56 g |
| Water to make | 1 l |

Adjust pH to 4.4 by using ammonia water or glacial acetic acid.
(Composition of Fixing Solution)

| Water | 800 ml |
|---|---|
| Ammonium thiocyanate | 120 g |
| Ammonium thiosulfate | 150 g |
| Sodium sulfite | 15 g |
| Ethylenediaminetetraacetic acid | 2 g |
| Water to make | 1 l |

Adjust pH to 6.2 by using ammonia water or glacial acetic acid.
(Composition of Fixing Solution Replenisher)

| Water | 800 ml |
|---|---|
| Ammonium thiocyanate | 150 g |
| Ammonium thiosulfate | 180 g |
| Sodium sulfite | 20 g |
| Ethylenediaminetetraacetic acid | 2 g |
| Water to make | 1 l |

Adjust pH to 6.5 by using ammonia water or glacial acetic acid.
(Composition of Stabilizing Solution and Stabilizing Solution Replenisher)

| Water | 900 ml |
|---|---|
| p-octylphenoloxy-deca(ethyleneoxy)hydrogen | 2.0 g |
| Dimethylolurea | 0.5 g |
| Hexamethylenetetramine | 0.2 g |
| 1,2-benziosthiazoline-3-one | 0.1 g |
| Siloxane (L-77, manufactured by UCC Co.) | 0.1 g |
| Ammonia water | 0.5 ml |
| Water to make | 1 l |

Adjust pH to 8.5 by using ammonia water or 50% sulfuric acid.

Furthermore, minimum yellow density (DB2) of each fresh sample was obtained in the same color development process as employed previously except replacing bleaching process time of each samle by 25 seconds.

The fine solid particle dispersions of the dyes added in each sample and evaluation results are shown in Table 6.

TABLE 6

| Sample No. | Dispersion | SG | DB1 | ΔSB | DB2 | Remarks |
|---|---|---|---|---|---|---|
| 200 | None | 1.98 | 0.13 | 98 | 0.24 | Comparison (yellow colloidal silver) |
| 201 | A | 1.94 | 0.09 | 99 | 0.09 | Invention |
| 202 | B | 1.96 | 0.06 | 98 | 0.06 | Invention |
| 203 | C | 1.97 | 0.06 | 98 | 0.06 | Invention |
| 204 | D | 1.95 | 0.08 | 98 | 0.08 | Invention |
| 205 | E | 1.96 | 0.06 | 95 | 0.06 | Invention |
| 206 | F | 1.97 | 0.05 | 96 | 0.05 | Invention |
| 207 | G | 1.96 | 0.06 | 94 | 0.06 | Invention |
| 208 | H | 1.95 | 0.07 | 95 | 0.07 | Invention |
| 209 | I | 1.94 | 0.06 | 96 | 0.07 | Invention |
| 210 | J | 1.97 | 0.06 | 94 | 0.10 | Invention |
| 211 | K | 1.93 | 0.07 | 96 | 0.06 | Invention |
| 212 | L | 1.96 | 0.06 | 94 | 0.06 | Invention |
| 213 | M | 1.82 | 0.08 | 92 | 0.09 | Comparison |
| 214 | N | 1.77 | 0.10 | 90 | 0.10 | Comparison |
| 215 | O | 1.80 | 0.12 | 87 | 0.10 | Comparison |
| 216 | P | 1.79 | 0.13 | 85 | 0.14 | Comparison |

As can be seen from Table 6, the green sensitivity of the lightsensitive materials prepared by using the fine solid particle dispersions of the dyes of the present invention which are substitution of the yellow colloidal silver is high. From this result, it is found that the green sensitivity loss caused by the absorption in the wavelength longer than blue light region by yellow colloidal silver and known dyes is improved. Further, the lightsensitive materials prepared by using the fine solid particle dispersions of the dyes of the present invention are improved in fog of blue lightsensitive layer and unpreferable sensitivity variation in the storage of the lightsensitive materials compared with the lightsensitive materials prepared by using known dyes.

Furthermore, with the lightsensitive materials prepared by using the fine solid particle dispersions of the dyes of the present invention, since it is possible that time necessary for bleaching process is shortened without lowering an image quality, it is found that these materials are suitable for rapid processing.

What is claimed is:

1. A dye represented by the following formula (1);

Formula (1)

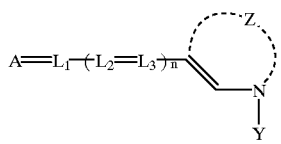

wherein A represents an acidic nucleus, $L_1$, $L_2$ and $L_3$ represent a methine group, n represents 0, 1 or 2, Z represents a nonmetalic atom group necessary to form a heterocyclic group by bonding with a nitrogen atom included in the formula (1), Y represents a substituent represented by the following formula (2) or a heterocyclic group;

Formula (2)

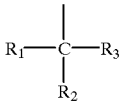

wherein $R_1$ and $R_2$ represent an alkyl group, and $R_1$ and $R_2$ may form a ring by bonding with each other, $R_3$ represents a hydrogen atom or an electron withdrawing group:

said dye represented by the formula (1) has at least one carboxy group or one alkylsulfonamide group in an aromatic ring portion of its molecular structure.

2. A fine solid particle dispersion of a dye represented by the following formula (1), Formula (1)

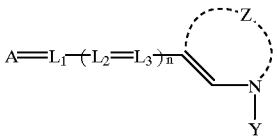

wherein A represents an acidic nucleus, $L_1$, $L_2$ and $L_3$ represent a methine group, n represents 0, 1 or 2, Z represents a nonmetalic atom group necessary to form a heterocyclic group by bonding with a nitrogen atom included in the formula (1), Y represents a substituent represented by the following formula (2) or a heterocyclic group;

Formula (2)

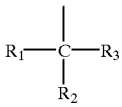

wherein $R_1$ and $R_2$ represent an alkyl group, and $R_1$ and $R_2$ may form a ring by bonding with each other, $R_3$ represents a hydrogen atom or an electron withdrawing group:

said dye represented by the formula (1) has at least one carboxy group or one alkylsulfonamide group in an aromatic ring portion of its molecular structure.

* * * * *